United States Patent [19]
Roffman et al.

[11] Patent Number: 5,861,114
[45] Date of Patent: Jan. 19, 1999

[54] METHOD OF MANUFACTURING COMPLEX OPTICAL DESIGNS IN SOFT CONTACT LENSES

[75] Inventors: Jeffrey H. Roffman; Timothy A. Clutterbuck, both of Jacksonville; Wallace Anthony Martin, Orange Park, all of Fla.; Wybren van der Meulen, Neunen, Netherlands; Edgar V. Menezes; Kornelis Renkema, both of Jacksonville, Fla.; Robert B. Phillips, Orange Park, Fla.; Victor Lust; Jongliang Wu, both of Jacksonville, Fla.; Gerbrand Eshuis, Hgogeveen, Netherlands

[73] Assignee: Johnson&Johnson Vision Products, Inc., Jacksonville, Fla.

[21] Appl. No.: 829,766

[22] Filed: Mar. 31, 1997

Related U.S. Application Data

[63] Continuation-in-part of Ser. No. 536,930, Sep. 29, 1995, Pat. No. 5,702,735, which is a continuation-in-part of Ser. No. 257,794, Jun. 10, 1994, Pat. No. 5,545,366.

[51] Int. Cl.$^6$ ..................................................... B29D 11/00
[52] U.S. Cl. .............................. 264/2.5; 264/1.1; 425/808
[58] Field of Search ..................................... 264/1.1, 1.36, 264/1.37, 2.5; 425/808

[56] References Cited

U.S. PATENT DOCUMENTS

| | | |
|---|---|---|
| 4,129,628 | 12/1978 | Tamutus . |
| 4,327,606 | 5/1982 | Howden . |
| 4,383,672 | 5/1983 | Kreuttner ................................. 425/808 |
| 4,495,313 | 1/1985 | Larsen . |
| 4,537,732 | 8/1985 | Veda et al. ................................ 264/1.1 |
| 4,565,348 | 1/1986 | Larsen . |
| 4,637,697 | 1/1987 | Freeman . |

(List continued on next page.)

FOREIGN PATENT DOCUMENTS

| | | |
|---|---|---|
| 0 440 578 A1 | 8/1991 | European Pat. Off. . |
| 0 458 734 A | 11/1991 | European Pat. Off. . |
| 0 686 486 A | 12/1995 | European Pat. Off. . |
| 0 687 549 A | 12/1995 | European Pat. Off. . |
| 0 687 551 A2 | 12/1995 | European Pat. Off. . |
| 0 728 707 A | 8/1996 | European Pat. Off. . |

OTHER PUBLICATIONS

Patent Abstracts of Japan, vol. 013, No. 523 (C–657), 21 Nov. 1989.
Patent Abstracts of Japan, vol. 015, No. 171 (M–1108), 30 Apr. 1994.
DeCarle, John, "A Refrative Multizone Bifocal" *Transactions of B.C.L.A. Conference*, Birmingham, 1989 (England).
Patent Abstracts of Japan, vol. 018, No. 229 (M–1598), 26 Apr. 1994.
Patent Abstracts of Japan, vol. 011, No. 372, Publ. No. JP–62144908, 29 Jun. 1987.

*Primary Examiner*—Mathieu D. Vargot

[57] ABSTRACT

A method of manufacturing complex optical surfaces in soft contact lenses includes a first step of defining the complex optical surfaces with a computer assisted drafting program using a mix of patient determined parameters and selected manufacturing process determined parameters to define a mathematical "meta lens". A machine code data set is then generated to machine a plurality of contact lens mold inserts to define a complex optical surface on each of the inserts. The machining step is conducted with a single point diamond lathe having submicron precision and repeatability. A first and second plurality of intermediate contact lens mold halves are then molded with said contact lens mold inserts to define said complex optical surfaces on said mold halves having micron range transitions between optical surfaces. The complex geometric forms and optical surfaces include bifocal lenses, aspheric lenses, and toric lenses wherein the lenses may include parabolic or elliptical geometry. The first plurality of mold halves is assembled with the second plurality of mold halves with a polymerizable monomer therebetween and polymerized to form a plurality of soft contact lenses having said complex optical surfaces defined thereon.

27 Claims, 15 Drawing Sheets

U.S. PATENT DOCUMENTS

| | | |
|---|---|---|
| 4,640,489 | 2/1987 | Larsen . |
| 4,680,336 | 7/1987 | Larsen et al. . |
| 4,704,016 | 11/1987 | De Carle . |
| 4,793,953 | 12/1988 | Maus . |
| 4,890,913 | 1/1990 | De Carle . |
| 4,928,435 | 5/1990 | Masaki et al. . |
| 4,985,186 | 1/1991 | Nose .................. 264/1.7 |
| 5,171,348 | 12/1992 | Umetani et al. . |
| 5,185,107 | 2/1993 | Blake ................... 264/1.1 |
| 5,456,864 | 10/1995 | Wickes et al. . |
| 5,466,147 | 11/1995 | Appleton et al. . |
| 5,538,674 | 7/1996 | Nisper .................. 264/1.31 |
| 5,620,717 | 4/1997 | Wickes et al. . |
| 5,641,437 | 6/1997 | Williams et al. ............ 264/2.5 |

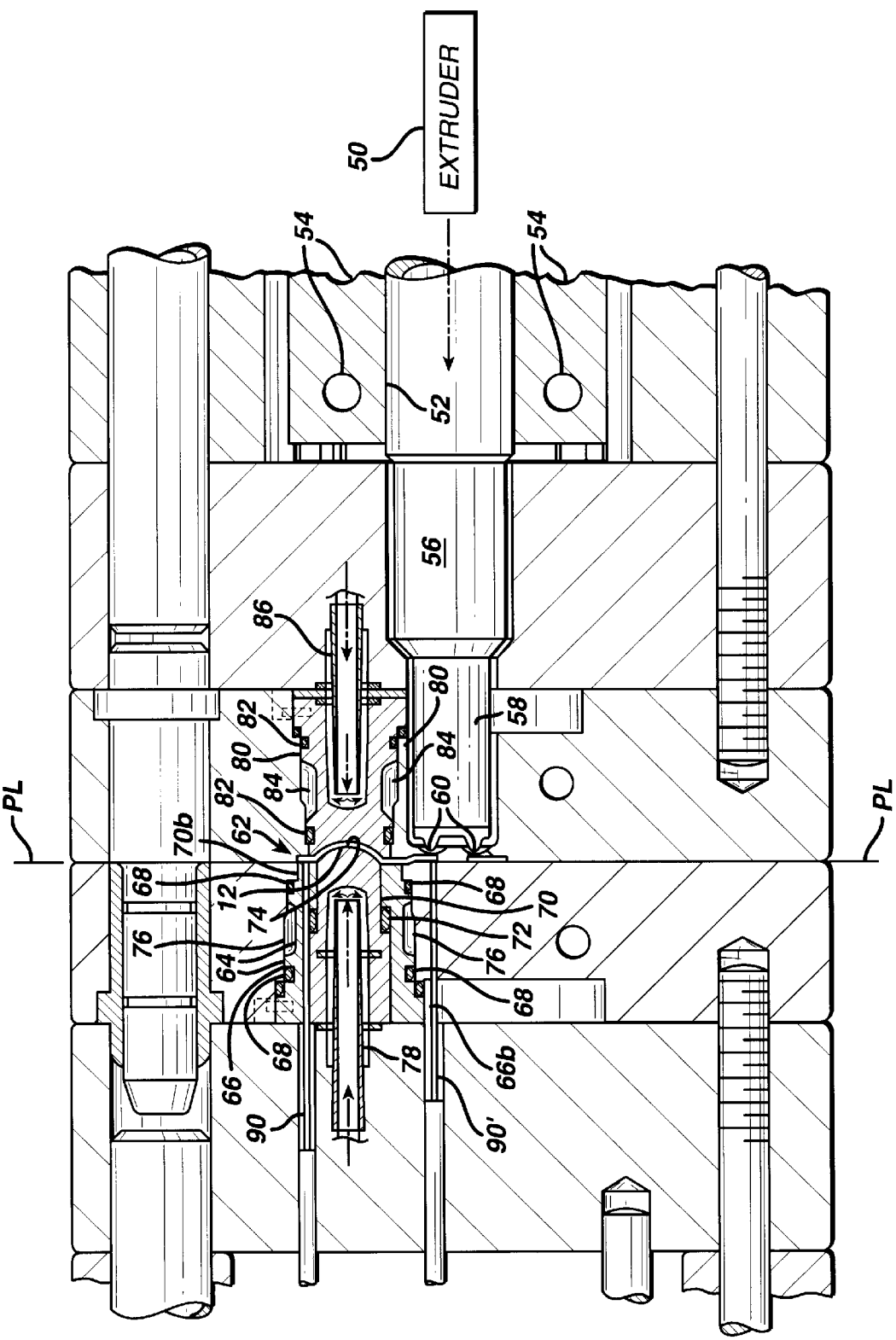

FIG. 15

CONTACT LENS SPECIFICATIONS

| LENS DESIGN GROUP | | | | LENS METROLOGY | | | |
|---|---|---|---|---|---|---|---|
| PRODUCT | ONE - DAY BIFOCAL | DESIGN | TAC | | | | |
| CODE / I.D. | MGVM100E | DATE | 03/30/98 | | | | |
| Eq. BCR | 8.752 | | | | | | |
| BC / DIAM | 8.75 / 14.20 | CHECK | | | | | |
| POWER | - 3.00D / +1.50DA | DATE | | | | | |

| BACK SURFACE | | | | | | | |
|---|---|---|---|---|---|---|---|
| DESCRIPTION | RADIUS | DIAMETER | SAG. | SHAPE(K) | LENGTH | VOL. (ul) | AREA |
| 1. DISTANCE | 8.400 | 2.000 | 0.060 | | 1.002 | 0.09 | 3.15 |
| 2. NEAR | 8.673 | 3.300 | 0.101 | | 0.658 | 0.59 | 5.48 |
| 3. DISTANCE | 8.400 | 4.450 | 0.136 | | 0.591 | 1.65 | 7.20 |
| 4. NEAR | 8.673 | 5.250 | 0.117 | | 0.417 | 2.17 | 6.35 |
| 5. DISTANCE | 8.400 | 8.000 | 0.593 | | 1.499 | 21.43 | 31.29 |
| INTERMEDIATE ZONE | 8.485 | 13.200 | 2.151 | | 3.397 | 206.40 | 114.65 |
| PERIPHERAL BEVEL | 9.917 | 14.210 | 0.483 | | 0.699 | 70.64 | 30.10 |
| TOTALS : | | | 3.640 | | 8.263 | 302.96 | 198.22 |

| FRONT SURFACE | | | | | | | |
|---|---|---|---|---|---|---|---|
| DESCRIPTION | RADIUS | DIAMETER | SAG. | WIDTH | LENGTH | VOL. (ul) | AREA |
| CENTRAL OPTIC | 8.994 | 8.000 | 0.938 | 4.000 | 4.145 | 24.02 | 53.03 |
| LENTICULAR | 8.764 | 11.200 | 1.056 | 1.600 | 1.921 | 79.21 | 58.17 |
| LENT. BEVEL | 8.661 | 14.043 | 1.537 | 1.422 | 2.098 | 196.58 | 83.61 |
| EDGE CHAMLER | 8.356 | 14.155 | 0.088 | 0.073 | 0.147 | 19.41 | 4.63 |
| EDGE FILLET | 0.112 | 14.189 | 0.050 | 0.017 | | | |
| SIDE WALL | | 14.200 | 0.065 | | | 11.92 | |
| KNIFE EDGE | 0.017 | 14.210 | 0.010 | 0.005 | | | |
| TOTALS : | | | 3.745 | | 8.311 | 331.15 | 199.45 |

| LENS / MATERIAL CHARACTERISTICS | | | | | |
|---|---|---|---|---|---|
| LENS THICKNESS | VALUE | VOLUME / AREA | VALUE | MATL. FACTORS | VALUE |
| CENTER THICKNESS | 0.105mm | LENS VOLUME (ul) | 28.18 | REF. INDEX | 1.4003 |
| OZ JUNCTION THCK | 0.152mm | TOTAL SURF. AREA | 397.67 | EXP. LINEAR | 1.1265 |
| AVG. LENS THICKNESS | 0.149mm | AVERAGE Dk /L | 14.40 | EXP. RADIAL | 1.1424 |
| AVG. THICK @ 6mm | 0.121mm | AVG. Dk/L 6mm | 17.68 | ADD ADJ. (D) | 0.0000 |
| AV. THK. @ % T APERT | 0.132mm | SAG. @ / 10mm | 1.634 | | |
| @ FC BEVEL | 0.170mm | EQUIV. BCR @ 10mm | 8.468 | | |
| @ BC BEVEL | 0.171mm | | | | |
| MAX @ 0.68 FROM EDGE | 0.172mm | | | | |

FIG. 16

| DESIGN INPUT DATA ||||||
|---|---|---|---|---|---|
| PRODUCT | ONE - DAY BIFOCAL | VISTAKON™ || DESIGN | TAC |
| CODE / I.D. | MGVM100E | ^ || DATE | 03/30/98 |
| DATA FILE | VM 100.PWR | ^ || | |
| BC / DIAM | 8.40 / 14.20 | ^ || CHECK | |
| FIT BCRAD | 8.75mm | ^ || DATE | |

| LENS BACK SURFACE |||||||
|---|---|---|---|---|---|---|
| BASE CURVE | MULTIFOCAL | RAD. DIFF. | -0.085 | DIAMETER | 8.000 | # OF ZONES 5 |
| INTERMEDIATE | SPHERE | RADIUS | 8.485 | DIAMETER | 13.200 | |
| PERIPH. ZONE | SPHERE | RAD. DIFF. | 1.432 | DIAMETER | 14.200 | |
| | | ADD (D) | +1.50 | CYLINDER (D) | | |

| LENS FRONT SURFACE |||||||
|---|---|---|---|---|---|---|
| CENTRAL OPTIC | SPHERE | MIN. DIAM. | 8.000 | MAX. DIAM. | 8.000 | |
| | | MIN. C.T. | 0.105 | MIN. OZJT | 0.090 | APERTURE 0.050 |
| LENT BEVEL | SPHERE | WIDTH | 1.500 | LENT. JT | 0.170 | |
| | | LENS DIAM. | 14.200 | INP. EDGE HT. | 0.100 | FIN. EDGE HT. 0.065 |

| LENS MATERIAL |||||||
|---|---|---|---|---|---|---|
| MATERIAL | ETAFILCON A | HYD. R.I. | 1.4003 | Dk | 21.40 | MODULUS 37.0 |
| EXP. FACTORS | | LINEAR | 1.12650 | BC RADIAL | 1.14240 | |
| | | FC RADIAL < S > | 0.00000 | FC RADIAL < I > | 1.12650 | |
| PWR. FACTORS | | SPH. MINUS | 0.0000 | SPH. PLUS | 0.0000 | |
| | | ADD | 0.0000 | | | |

| MOLD / FRAME |||||||
|---|---|---|---|---|---|---|
| MATERIAL | POLYSTYRENE | FRONT CT | 0.800 | KNIFE EDGE | 0.015 | AMES RAD. 9.017 |
| PROCESS | MAX - 30mm | BACK CT | 0.600 | AMES CORR. | 2.2700 | FINGER CIRCA. 2.090 |
| EXP. FACTORS | - LINEAR | BASE CURVE | 0.99510 | FC MINUS | 0.99570 | FC PLUS 0.99570 |
| | - RADIAL | BASE CURVE | 0.99550 | FC MINUS < S > | -0.00032 | FC PLUS < S > -0.00032 |
| | | | | FC MINUS < I > | 0.99048 | FC PLUS < I > 0.99048 |

| BC INSERT ||| REAR CORE |||
|---|---|---|---|---|---|
| PROCESS | ONE - PIECE | | CENT. RAD. 6.877 | CENT. DIAM. | 10.931 |
| MATERIAL | BRASS - Ni | DIAMETER 14.495 | PERIPH. RAD. 8.533 | DIAMETER | 15.252 |

| FC INSERT ||| FRONT CORE |||
|---|---|---|---|---|---|
| PROCESS | ONE - PIECE | CT. CORR. 0.0150 | CENT. RAD. 8.289 | DIAMETER | 7.929 |
| MATERIAL | BRASS - Ni | DIAMETER 13.490 | PERIPH. RAD. 9.153 | DIAMETER | 14.200 |
| EDGE CHAMF. | | RADIUS 7.450 | | | |
| | | WIDTH 0.050 | | | |
| EDGE FILLET | | RADIUS 0.100 | | | |

FIG. 17   BACK SURFACE INSERT SPECIFICATIONS

LENS DESIGN GROUP

| PRODUCT | ONE - DAY BIFOCAL | DESIGN | TAC |
|---|---|---|---|
| CODE / I.D. | MGVM100E | DATE | 03/30/98 |
| | | CHECK | |
| BC / DIAM | 8.75 / 14.20 | DATE | |
| POWER | +1.50DA | | |

OPTICAL TOOLING

| INSERT ID | MGVM100EBC00 | NAME | |
|---|---|---|---|
| CNC FILE | | DATE | |
| MATERIAL | BRASS - Ni | | |
| LATHE | EPT | | |
| PROCESS | 30 mm | | |

INSERT DIMENSIONS

| DESCRIPTION | RADIUS | X - CENTER | Z - CENTER | X - END | Z - END | DIAMETER | SHAPE (K) |
|---|---|---|---|---|---|---|---|
| OZ ZONE #1 | 7.38618 | 0.00000 | 3.40380 | 0.00000 | -3.98237 | 1.78415 | |
| OZ ZONE #2 | 7.62622 | 0.00000 | 3.64556 | 0.89208 | -3.92831 | 2.94385 | |
| OZ ZONE #3 | 7.38618 | 0.00000 | 3.40076 | 1.47193 | -3.83727 | 3.96974 | |
| OZ ZONE #4 | 7.62622 | 0.00000 | 3.64967 | 1.98487 | -3.71372 | 4.68340 | |
| OZ ZONE #5 | 7.38618 | 0.00000 | 3.39701 | 2.34170 | -3.60813 | 7.13661 | |
| INTERMED. ZONE | 7.46092 | 0.00000 | 3.48225 | 3.56831 | -3.07004 | 11.77541 | |
| PERIPHERAL BEVEL | 8.72009 | 0.00000 | 5.33197 | 5.88770 | -1.10036 | 13.80000 | |
| CUT - OFF | | | | 6.32998 | -0.65732 | 12.65997 | |
| FLANGE | | | | 6.90000 | 0.00000 | 14.49500 | |
| SUBSTRATE | | | | 7.24750 | 0.00000 | | |

ZERO REF. AT FLANGE.

REAR CORE DIMENSIONS

| DESCRIPTION | RADIUS | X - CENTER | Z - CENTER | X - END | Z - END | DIAMETER |
|---|---|---|---|---|---|---|
| CENTRAL ZONE | 6.87700 | 0.00000 | -1.44935 | 0.00000 | 5.42765 | 10.93100 |
| PERIPHERAL ZONE | 8.53300 | 0.00000 | -3.82834 | 5.46550 | 2.72455 | 15.25200 |
| FLANGE | | | | 7.62600 | 0.00000 | 17.99800 |
| SUBSTRATE | | | | 8.99900 | 0.00000 | |

FIG. 18

BC INSERT NC CODE - FINISHED

| LENS DESIGN GROUP | | | | OPTICAL TOOLING | | | |
|---|---|---|---|---|---|---|---|
| PRODUCT | ONE - DAY BIFOCAL | DESIGN | TAC | INSERT ID | MGVM100EBC00 | | |
| CODE/I.D. | MGVM100E | DATE | 03/30/98 | CNC FILE | | | |
| | | | | MATERIAL | BRASS - Ni | | |
| BC / DIAM. | 8.75/14.20 | CHECK | | LATHE | EPT | | |
| POWER | +1.50DA | DATE | | PROCESS | 30mm | | |

```
%1011
(DESIGN : VISTAKON MULTIFOCAL )
(ID CODE: MGVM100E)
(FILENAME)
(DATE     : 03/30/98)
(DIAMETER)
N10 G90X8.5Z5
N15 G91G59X-L2Z-L2
N20 G90
N25 FL5
N30 G01X7.2475Z0.5G42
N35 FL4
N40 Z-9.55
N45 X6.615
N50 Z-10.582
N60 X8
N65 G0 G40 Z1

%1012
(OPTIC-ROUGH)
N70 G00 Z6
N75 G91 G59 Z-L2
N80 G90
N85 G00 X7.747G41
N90 FL5
N95 G01 Z0
N100 FL4
N105 G01 X6.9
N107 G03 X5.88770 Z-1.10036 R8.72009
N109 G03 X3.56831 Z-3.07004 R7.46092
N111 G03 X2.34170 Z-3.60813 R7.38618
N113 G03 X1.98487 Z-3.71372 R7.62622
N115 G03 X1.47193 Z-3.83727 R7.38618
N117 G03 X0.89208 Z-3.92831 R7.62622
N119 G03 X0.00000 Z-3.98237 R7.38618
N124 G0 G40 Z1

%1013
(OPTIC-FINISH)
N129 G00 Z6
N134 G91 G59 Z-L2
N139 G90
N144 G00 X7.7475G41
```

```
N149 FL5
N154 G01 Z0
N159 FL4
N164 G01 X6.9
N166 G03 X5.88770 Z-1.10036 R8.72009
N168 G03 X3.56831 Z-3.07004 R7.46092
N170 G03 X2.34170 Z-3.60813 R7.38618
N172 G03 X1.98487 Z-3.71372 R7.62622
N174 G03 X1.47193 Z-3.83727 R7.38618
N176 G03 X0.89208 Z-3.92831 R7.62622
N178 G03 X0.00000 Z-398237 R7.38618
N183 G0 G40 Z1

%1014
(KNIFE EDGE)
%1015
(TORIC)
%1016
(SLAB-OFF)
%
```

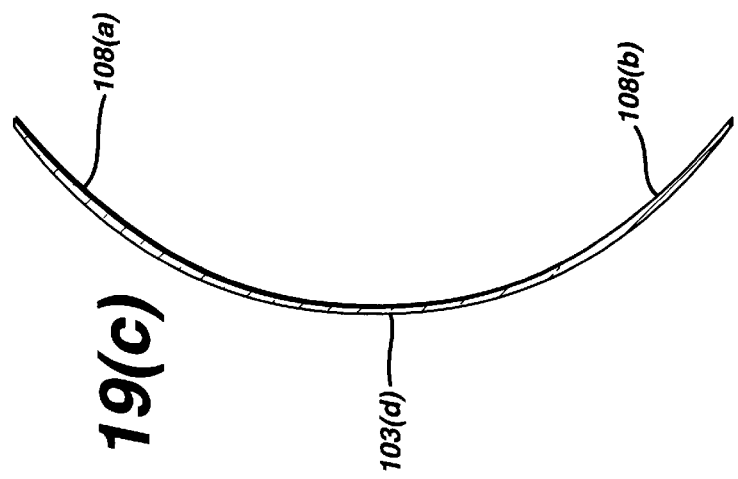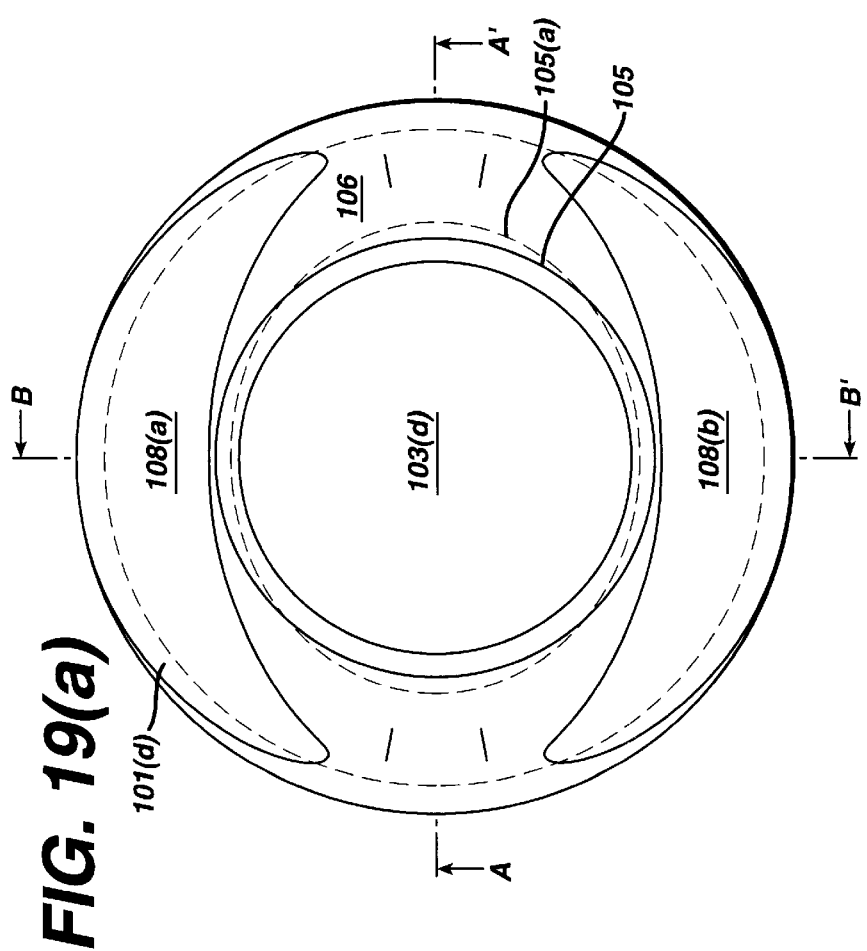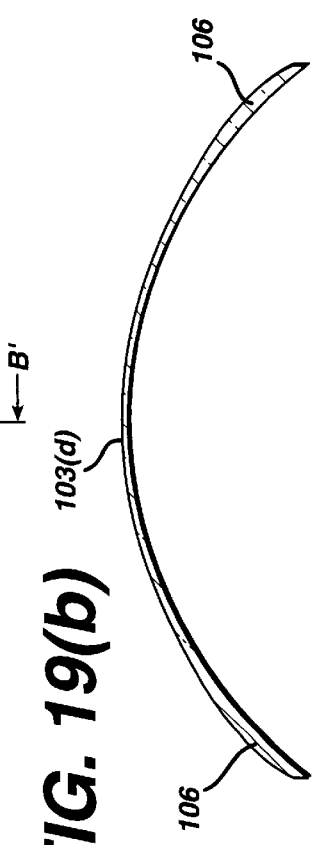

METHOD OF MANUFACTURING COMPLEX OPTICAL DESIGNS IN SOFT CONTACT LENSES

CROSS REFERENCE TO RELATED CO-PENDING APPLICATION

This application is a continuation-in-part of co-pending application U.S.S.N. 08/536,930 filed Sep. 29, 1995 entitled "Molding Arrangement To Achieve Short Mold Cycle Time", now U.S. Pat. No. 5,702,735, which is a continuation-in-part of co-pending application U.S.S.N. 08/257,794, filed Jun. 10, 1994 entitled "Molding Arrangement To Achieve Short Mold Cycle Time", now U.S. Pat. No. 5,545,366.

BACKGROUND OF THE INVENTION

1. Field of the Invention

The present invention relates generally to a method for molding front and back curve mold halves which are used for subsequent molding of a soft contact lens therebetween, and more specifically, to a method and apparatus for creating and forming primary mold inserts having complex optical designs formed thereon and intermediate mold halves having the complex optical designs therein which are used to mold soft contact lenses therebetween.

2. Discussion of the Prior Art

U.S. Pat. No. 4,565,348 to Larsen discloses a typical prior art approach to manufacturing mold halves similar to the present invention. Pursuant to this prior art approach, the mold halves are molded as a set of eight mold halves carried on a frame in a 2x4 array. FIG. 3 of the Larsen patent illustrates a molded frame carrying a 2x4 array of concave front or female mold halves, while FIG. 5 therein shows a molded frame carrying a 2x4 array of convex back or male mold halves. The cluster assembly of the frame and molds is manufactured by injection molding the assembly as one piece with the molds being secured within an outer rectangular frame by small struts extending between the frame and the molds. The height of the frame is such that the surfaces of the molds are protected from scratching and mechanical damage during handling, and the frame in general has a shape facilitating stacking and handling. This prior art approach of molding such polystyrene mold halves in a cluster assembly typically takes approximately twenty-four (24) seconds, which is too long for the efficient production of such polystyrene mold halves. In contrast thereto, pursuant to the present invention, the molding of such polystyrene mold halves takes approximately three to six seconds, depending upon the wall thickness.

In this prior art approach, complementary sets of front and back mold halves are used in the production of hydrogel contact lenses by direct molding of a monomer mixture wherein the mixture is dissolved in a non-aqueous, water-displaceable solvent. After a dosing step in which the front concave mold halves are substantially filled with the polymerization mixture, the concave front mold halves are covered with the back mold halves in a manner in which no air bubbles are trapped beneath the back mold halves, which are brought to rest on the concave front mold halves properly aligned and without distortion. This is preferably performed with back mold halves which are put on as individual units on the pools of polymerizable mixture held in the front concave mold halves. Accordingly, prior to the mold covering step, the plurality of back mold halves are separated from the frame by breaking or cutting. The back mold members are preferably held by a mechanical device while they are separated from the frame and which thereafter is used to guide them down and place them all simultaneously on each of the concave front mold halves containing the polymerizable mixture. The monomer/solvent mixture is then subjected to conditions whereby the monomer(s) polymerize, such as irradiation with actinic visible or ultra-violet radiation, to thereby produce a polymer/solvent mixture in the shape of the reduced final size of the desired hydrogel lens.

After the polymerization process is completed, the two halves of the mold are separated (called demolding), typically leaving the contact lens in the front mold half, from which it is subsequently displaced. The front and back mold halves are used for only a single molding, after which they are disposed of. After the polymerization is complete, the solvent is displaced with water to produce a hydrated lens the final size and shape of which are quite similar to the size and shape of the original molded polymer/solvent article. The direct molding of hydrogel contact lenses is disclosed in U.S. Pat. No. 4,495,313 to Larsen, U.S. Pat. No. 4,680,336 to Larsen et al., U.S. Pat. No. 4,565,348 to Larsen, and U.S. Pat. No. 4,640,489 to Larsen et al., the entire disclosures of which are hereby incorporated by reference in this patent application.

U.S. Pat. Nos. 4,704,016 and 4,890,913 to John T. De Carle disclose a method of making zoned multi focal and bifocal contact lenses and teaches that the lenses may be formed as hard lenses or soft lenses. A methodology for moldings soft bifocal contact lenses is disclosed in U.S. Pat. No. 4,704,016.

U.S. Pat. No. 4,637,697 to Michael Freeman discloses multi focal contact lenses utilizing diffraction and refraction and discloses in column 10 thereof the direct cutting of the surface of the lens using a high precision lathe wherein the cutting point is a single point diamond.

An article published in the transactions of the BCLA conference, Birmingham, 1989 (England) entitled "A Refractive Multizone Bifocal" by John T. De Carle also discloses on page 70 the manufacture of the contact lens of De Carle patent 4,890,913 by direct cutting of the lens blank with a computer controlled lathe and discusses the difficulties encountered in the direct cutting of the optical surfaces on the concave side of the lens.

SUMMARY OF THE INVENTION

The present invention is a method of manufacturing complex optical designs in soft contact lenses. The present invention is particularly intended for the mass production of complex optical shapes through the use of intermediate mold halves wherein the intermediate mold halves are molded with complex geometric forms, said complex forms including bifocal lenses, aspheric lenses, and toric lenses wherein the lenses may include parabolic or elliptical geometry, the molding of which is not possible with conventional mass production technology.

The present invention includes the use of computer assisted design (CAD) to create geometric "meta lenses" in three dimensional geometric space, and computer assisted manufacturing (CAM) tools for translating the "meta lens" shape into machine code for driving a computer controlled lathe having sub micron, diamond point turning capabilities.

The present invention thus provides the capability for creating repeatable mold inserts having complex optical shapes or curves formed therein which enable formation of intermediate mold halves and soft contact lenses having micron range transitions between optical surfaces.

This invention also provides a computer assisted design program to assist in the design of soft contact lenses having complex optical shapes such as a concentric multi-ring bifocal design. Once the patient parameters i.e. diameter, K, distance power and near power are clinically determined, the CAD program will generate an optimal optical design for the lens to be molded.

It is therefore an object of the present invention to provide a method of manufacturing complex optical surfaces in soft contact lenses which includes the steps of atomically defining the complex optical surfaces with a computer assisted drafting program using a mix of patient determine parameters and selected process determine parameters to define a mathematical "meta lens"; automatically generating a machine code data set for machining a contact lens mold insert to define a complex optical surface thereon; machining a plurality of contact lens molds inserts with a single point diamond lathe, the lathe having submicron precision and repeatability; simultaneously molding a first plurality of contact lens mold halves with said contact lens mold inserts to define said complex optical surfaces on each of said plurality of mold halves; molding a second plurality of contact lens mold halves to cooperate the first plurality of contact lens molds halves, wherein a single first mold halve and a single second mold half cooperate to define a mold space for a soft contact lens therebetween; assembling said plurality of mold halves with a second plurality of mold halves with a polymerizable monomer therebetween, and then polymerizing said monomer to form a plurality of soft contact lenses having said complex optical surfaces defined thereon.

Additionally, it is a consideration that the specific embodiments of an apparatus for implementing the forgoing method be such that the optical surfaces of the molding inserts be interchangeable, so that each molding machine, capable of using a plurality of inserts during molding, is able to produce a variety of different prescription lens mold halves. It is advantageous for such the mold insert be easily interchangeable, whereby swift alteration of the mold shape may be executed, without concern for damaging either the optical surface or the attending structures.

The manufacture of the mold halves involves the separate molding of each front mold half and of each back mold half. The inner concave surface of the front mold half defines the outer surface of the contact lens, while the outer convex surface of the back mold half defines the inner surface of the contact lens which rests upon the eye. Accordingly, the shape of the inner concave surface of the female mold half and the shape of the outer convex surface of the male mold half must have acceptable optical quality surfaces.

The present invention also provides very rapid cooling of the critical optical quality surfaces of the contact lens molds, i.e., the inner concave surface of the front mold half and the outer convex surface of the back mold half.

Each mold half also defines a circumferential flange around the convex and concave surfaces. In general, the mold halves are processed and handled by robotic handling systems which handle (as by vacuum grasping) the back side of the flange which is on the opposite side from the optical quality surface of the mold half.

In accordance with the teachings herein, the present invention provides a method for molding a mold half which is used, with a second complementary mold half, for the subsequent molding of a soft contact lens. Each mold half defines a convex curved surface and a concave curved surface spaced therefrom, with one or more of the convex or concave surfaces defining an optical quality curved surface having complex optical surfaces thereon for molding the desired optical qualities into the soft contact lens.

A heated mold is used (to ensure the flow rate does not decrease and shear stresses increase) for introduction of a molten mold material, such as from a family of thermoplastics, such as polystyrene, polycarbonate, poly [4-methyl-pentene 1] (TPX), polyvinyl chloride (PVC), polyethylene, polypropylene, copolymers of styrene with acrylonitrile or butadiene, acrylates such as polymethyl methacrylate, polyacrylonitrile, polyamides, polyesters, etc. through a hot runner system to a plurality of mold cavities. Each mold cavity defines an optical quality curved surface and also a second noncritical curved surface for the mold half.

In a preferred embodiment, the material being molded into the mold half is polystyrene, but could be any suitable thermoplastic such as mentioned hereinabove in the family of thermoplastics. To facilitate the mass production of the many different contact lenses inherent in manufacturing a large number of powers and complex optical configurations, at least one of the mold cavities comprises a first insert on the optical quality side of the mold cavity and a second insert on the second side of the mold cavity. Each insert can be manufactured as one integral component, or can be a two-piece design.

In conventional molding, the power insert which defines the power of the lens may be the convex surface of the mold insert which forms the front curve mold half. When near add powers are added to the lens, they may be formed on the concave mold insert surface of the mold insert forming the backcurve mold half.

It is preferable that if the optical insert (the insert surface forming the optical portion of the mold) is a complex optical surface defining insert, it should comprise two pieces, an insert and a bushing as will be hereinafter described in detail.

In one instance used for description of the specific embodiments of the invention, the mold insert is used in the production of both front and back curve mold halves which define the optical surfaces (front and back surface) of the contact lens. These mold inserts may comprises two pieces: a bushing, and a power insert positioned within the bushing. The bushing comprises a cylindrical body, through which the power insert is positioned. The power insert may be either the concave or the convex surface, depending on which mold half is to be molded, but as described will have an optical surface which extends to the land of the bushing and defines the complex optical quality surface, and one of the optical powers of the contact lens which is subsequently produced by the mold half. The optical surface will be surrounded by an annular flange. The end of the bushing, which receives the optical end of the power insert, comprises an annular flat surface which circumferentially surrounds the flange and curvate end of the power insert.

When the power insert is a convex surface, the circular interface defined at the radial extent of the convex surface and the inner radial extent of the annular flat surface of the bushing comprises a sharp discontinuity of curvature, and defines an sealing edge for separating the extra hydrophilic material from that which forms the lens during the mold filling stage.

The different optical powers of the lenses can be changed by merely changing the power insert to substitute a different power insert having a different optical end surface.

In the bifocal variation, a second power insert is similarly disposed within a bushing, wherein the near add optical power is defined by the optical concave surface of the back curve insert. The optical surfaces thus defined by the two mold surfaces thus comprise both the concave recession or the convex protuberance. These optical surfaces are preferably formed on the insert by special surface treatment and single diamond point cutting which is set forth more fully in the detailed description provided hereinbelow.

The bushings into which these variations of the power insert are disposed understandably comprises a wider central volume, and a wider orifice at the operational end. The bushing does, however, comprise an annular flat surface which is preferably aligned to be co-planar with the annular region of the power insert.

In both variations, the second insert on the second side of the mold cavity does not define as high an optical quality surface, and so can easily be manufactured as one integral component.

Each of the insert embodiments, as well as the non-optical surface inserts includes a bubbler positioned internally therein, through which coolant is circulated by the cooling system in a turbulent mode against inner surfaces of the insert. Moreover, each embodiment of the optical surface defining inserts, and the non-optical inserts, have a circumferential cooling passageway disposed therearound. In the two piece insert, the passageway is defined either in the exterior surface of the bushing element, or in the steel mold block retaining the insert, through which coolant is circulated in a turbulent mode by the cooling system.

In a preferred embodiment, the molding arrangement includes a plurality (such as four or eight) of mold cavities positioned at one end of, and spaced around, the hot runner system.

In the arrangement and method of the present invention, a heated molding machine introduces a molten mold material through a hot runner system to at least one mold cavity. As set forth hereinabove, each mold cavity defines an optical quality curved surface and also a second curved surface for the mold half.

Pursuant to the teachings of the present invention, the mold cavity comprises a first insert on the optical quality side of the mold cavity and a second insert on the second side of the mold cavity. Each of the first and second inserts has a circumferential cooling passageway therearound or in proximity of the insert, through which coolant is circulated by a cooling system to provide for faster cooling of the mold cavity. This allows quicker setting and locking of minimal temperature residual stresses in the mold half and a faster molding and cycling time. Also, the direct polymer flow path reduces the cooling time (locks in the minimal residual stresses) to reduce the cycle time.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout the several views, and in which:

FIGS. 14 is a sectional view through a hot runner mold constructed pursuant to the teachings of the present invention, in which one of eight similar mold cavities for a front mold half is shown in section to illustrate the construction of each mold cavity, wherein the operational end thereof comprises both a curvate portion and an annular flat surface.

FIG. 15 is a Contact Lens Specification generated by the CAD program of the present invention.

FIG. 16 is a sample chart or printout of the Design Input Data form used by the CAD program of the present invention.

FIG. 17 is a Back Surface Insert Specification prepared by the CAD program of the present invention.

FIG. 18 is a print out of the CNC code generated by the CAD program of the present invention used to machine a back curve mold insert.

FIG. 19(a) is an enlarged diagrammatic front view of contact lens having a complex optical geometry with "slab-off" zones suitable for maintaining lens orientation for toric optical corrections.

FIG. 19(b) is an enlarged horizontal cross section view taken along section line A–A' of FIG. 19(a).

FIG. 19(c) is an enlarged vertical cross section view taken along section line B–B' of FIG. 19(a).

DETAILED DESCRIPTION OF THE PREFERRED EMBODIMENT

Figure 1:
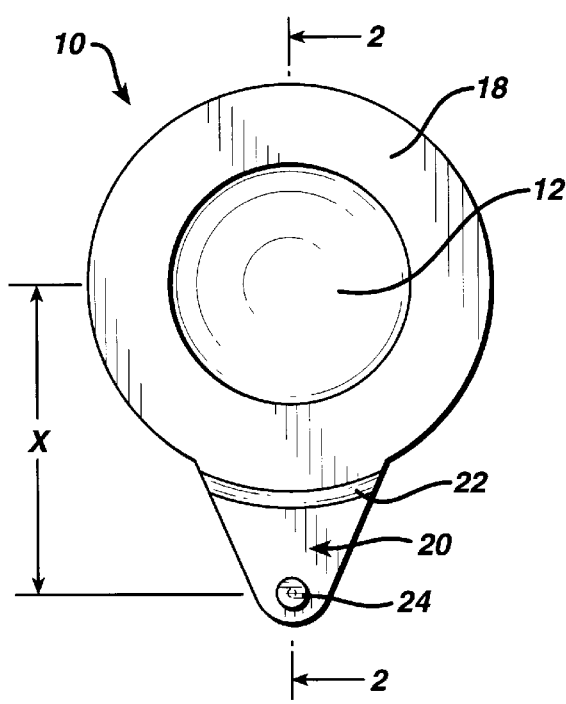
FIGS. 1 and 2 are respectively top elevational and side sectional views of one embodiment of a front (female) mold half which is produced pursuant to the present invention.
Figure 2:
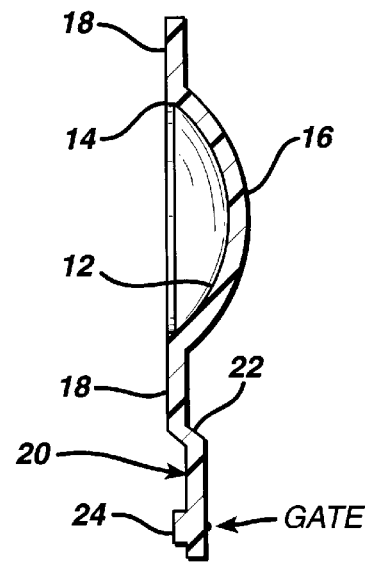

Referring to the drawings in detail, FIGS. 1 and 2 illustrate respectively top elevational and side views of one embodiment of a front mold half 10 useful in the production of a contact lens by the polymerization of a polymerizable composition in a mold assembly composed of two complementary front and back mold halves. The front mold half 10 is preferably formed of polystyrene, but could be any suitable thermoplastic such as mentioned hereinabove in the family of thermoplastics, which is transparent to visible and ultraviolet light to allow irradiation therethrough with light to promote the subsequent polymerization of a soft contact lens. A suitable thermoplastic such as polystyrene also has other desirable qualities such as being moldable to surfaces of optical quality at relatively low temperatures, having excellent flow characteristics and remaining amorphous during molding, not crystallizing, and having minimal shrinkage during cooling.

The present invention provides the capability for creating repeatable mold inserts having complex optical shapes or curves formed therein which enable formation of intermediate mold halves and soft contact lenses having micron range transitions between optical surfaces.

This invention also provides a computer assisted design program to assist in the design of soft contact lenses having complex optical shapes such as a concentric multi-ring bifocal design. Once the patient parameters i.e., diameter, K, distance power and near power are clinically determined, the CAD program will generate an optimal optical design for the lens to be molded.

OVERVIEW OF THE METHOD

Figure 8:
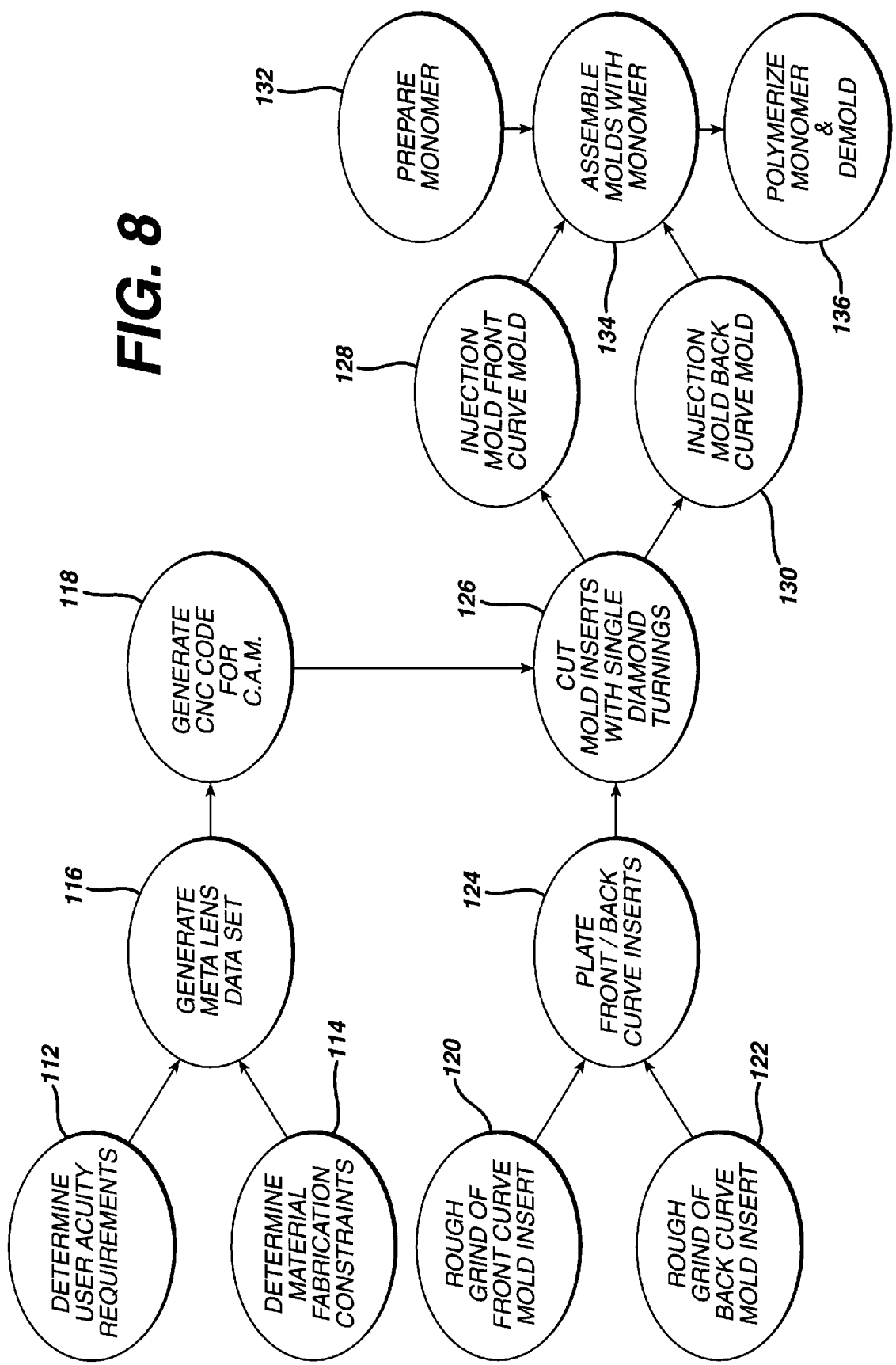
FIG. 8 is a diagrammatic flow chart of the method of the present invention.

The present invention will be summarized with respect to FIG. 8, which illustrates a flow chart of the method of the present invention, which provides a method of manufacturing complex optical surfaces in soft contact lenses.

The present invention includes the steps of mathematically defining the complex optical surfaces of a "meta lens" with a computer assisted design program. Several steps are begun in parallel. First, the patient determine parameters are determined as indicated at step 112, and selected process parameters relevant to the fabrication facility are determined at step 114. These two sets of parameters are used to mathematically determine the optical parameters at step 116, which parameters define a mathematical "meta lens".

Simultaneously, mold inserts useful in the fabrication facility may be prepared by rough grinding of inserts for the front curve mold half as indicated at step 120 and back curve mold halves as indicated at step 122. These inserts are then plated as indicated at step 124, to form a coating that can be cut with a single diamond point turning lathe.

After the "meta lens" has been defined, the program of the present invention then automatically generates a CNC machine code data set at step 118 for machining the front and back curve mold inserts to define the complex optical surfaces of the lens to be formed.

After the inserts have been plated, and the CNC code generated, the inserts are machined as indicated at step 126 to provide a pair, or a plurality of pairs of mold inserts. The machining is done with a single point diamond lathe, the lathe having submicron precision and repeatability.

After the mold inserts have been created, the invention contemplates simultaneously molding a first plurality of contact lens front curve mold halves with the front curve mold insert as indicated at step 128, to define an optical surface on each of said plurality of front curve mold halves. Simultaneously therewith, a second plurality of contact lens back curve mold halves are molded at step 130 to cooperate the first plurality of contact lens front curve molds halves, wherein a single first mold halve and a single second mold half cooperate to define a mold space for a soft contact lens having complex optical geometry therebetween.

The polymerizable monomer for the lens is prepared at step 132 and the monomer and mold halves are assembled at step 134 with the polymerizable monomer therebetween. Finally, at step 136 the monomer is then polymerized to form a plurality of soft contact lenses having said complex optical surfaces defined thereon.

Additionally, it is a consideration that the specific embodiments of an apparatus for implementing the forgoing method be such that the optical surfaces of the molding inserts be interchangeable, so that each molding machine, capable of using a plurality of inserts during molding, is able to produce a variety of different prescription lens mold halves. It is advantageous for such the mold insert be easily interchangeable, whereby swift alteration of the mold shape may be executed, without concern for damaging either the optical surface or the attending structures.

The prior art teaches the use of simple geometry polished stainless steel inserts that can be formed with a multi axis grinder, but the requirement for close matching large numbers of sets of these power inserts for complex lens mold sets, makes the use of conventional grinding technology extremely difficult, if not impossible, in the formation of multifocal and bifocal molded lenses.

The use of polished stainless steel power inserts requires careful matching of the insert to the bushing, with a desired axial tolerance of 5 to 10 microns. This tolerance is difficult to achieve with conventional tool and die technology, which forms the steel power inserts with multiple grind, polish and inspect steps, which may require 10 to 15 repetitions to achieve the desired sphericity and surface smoothness.

At each grind polish and inspect step, the axial dimensions is slightly altered, and with multiple steps, final assembly requires a shim assemble to achieve the desired axial dimension. Further, each time the power is changed and a new power insert used, the matching of the specific insert and its stacking shims to a specific bushing, must be maintained. In as much as there may be 8 to 16 sets of individual bushing insert assemblies for each power of lens manufactured, the process requires matching and assembly of literally hundreds of mold inserts for each injection molding machine. Further, if one is damaged, the shim stack assembly must be carefully reconstructed, possibly creating significant downtime for the injection molding machine.

In the practice of the present invention, the combination of the defined "meta lens", the plated inserts, and the diamond point turning alleviates much of this custom matching and shim stacking and thus not only improves the yield of the injection molding line, but makes possible the matching of a plurality of distance powers with a plurality of near powers on either side of the lens that would be virtually impossible with present prior art techniques.

LENS DESIGN COMPUTER PROGRAM

The lens design program of the present invention comprises a computer program which generates lens designs based upon a series of input data. The computer program has the capability to calculate a mathematical or "meta" lens design and to print out charts and drawings illustrating the specifications of the mathematical design. The computer program can also generates CNC lathe control data for controlling a diamond point turning lathe which cuts inserts in accordance with the generated lens designs. The resulting inserts are used to manufacture injection molds to be used to make actual lenses.

In a preferred embodiment, the computer program is a windows based application written in Visual BASIC 4.0. It should be noted that other programming languages could be utilized to create the inventive lens design system for other CAD or CAD/CAM programs.

Figure 9A:
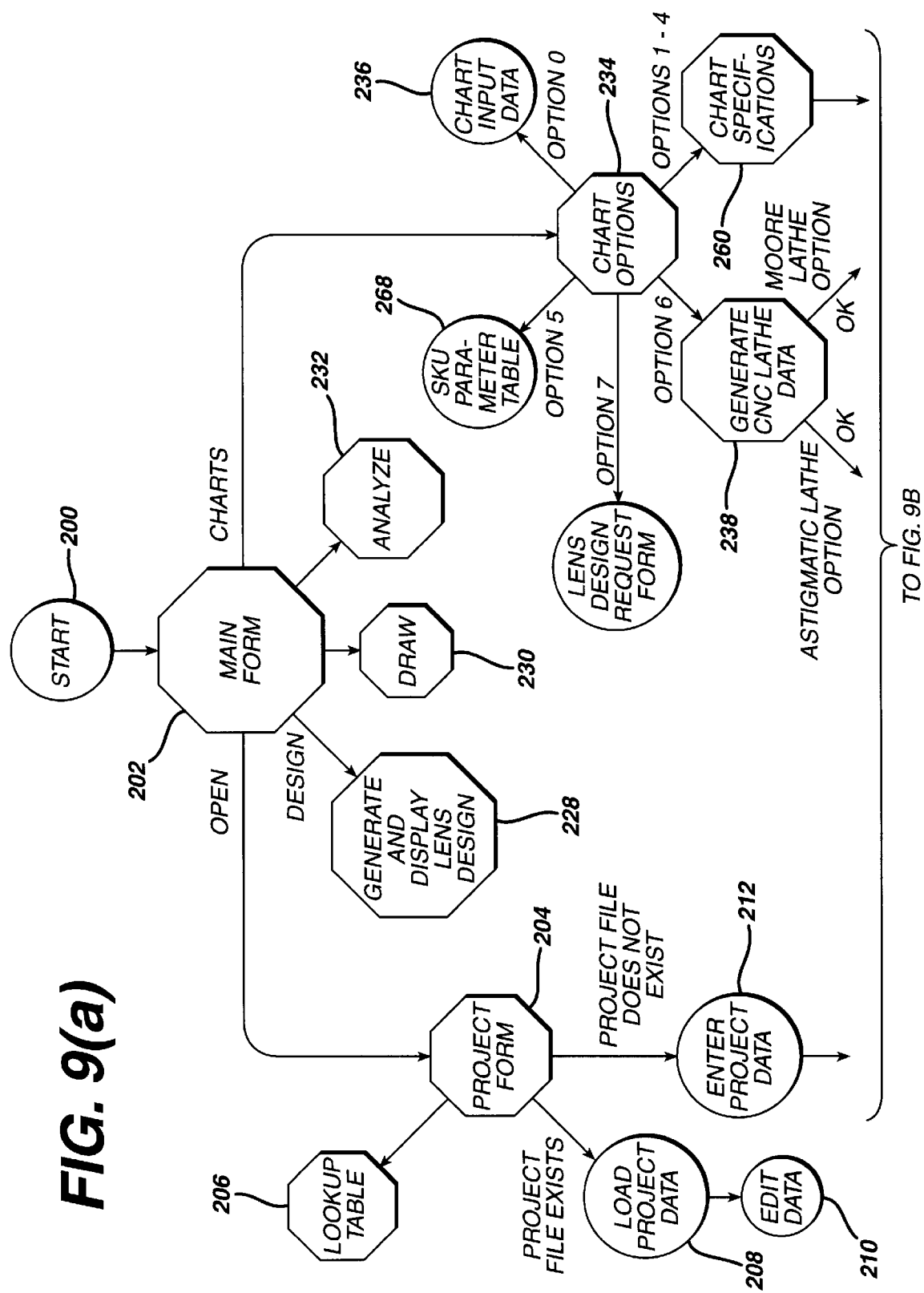
FIG. 9 is a diagrammatic flow chart of the computer assisted design (CAD) program of the present invention.
Figure 9B:
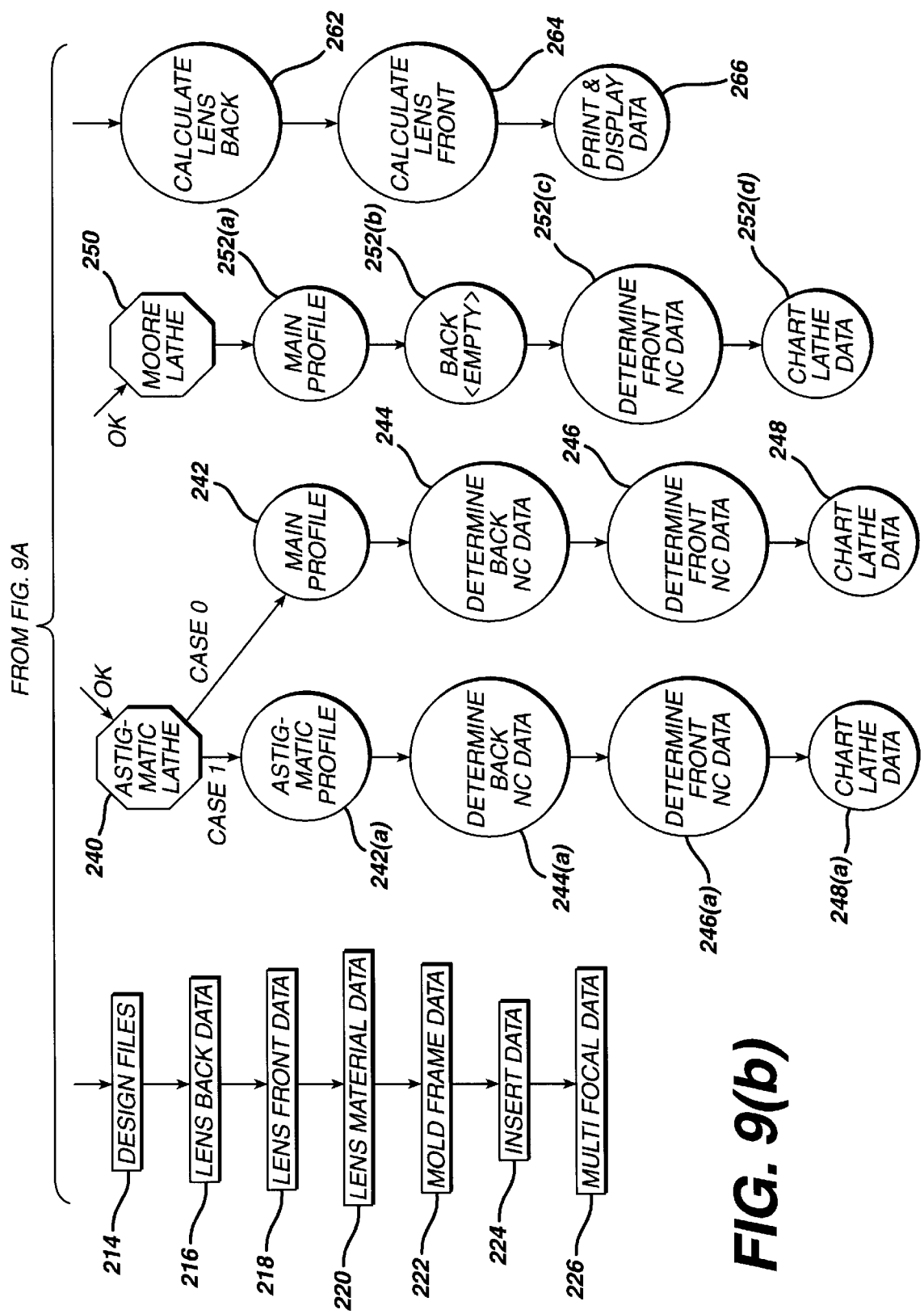

Referring to FIG. 9, at Start, as indicated a 200 the program displays a Main Form menu as indicated at step 202 which provides user selectable options in the form of command buttons, menus and text boxes. The Main Form provides the following command button options:

(A) OPEN—Enter Project Data
(B) DESIGN—Generate lens designs
(C) CHARTS—Generate and print lens design specifications and lathe control data
(D) ANALYZE—Generate and display analytical graphics
(E) DRAW—Generate lens design drawings From the Main Form menu presented at step 202, the user can select the OPEN command button which opens a Project Form as indicated at step 204. The Project Form provides the user the option to load and edit pre-existing project data or to enter new project data. Project data, including lens design data, is displayed in menu form on the display screen.

The Project Form menu also provides a Look-Up Table option at step 206 which allows the user to select insert tooling values for front and base inserts.

Project data relevant to each lens design is contained in the following data entry categories, and for exiting Projects, my be accessed at step 208:

(1) Design Files
(2) Lens Back Surface Data
(3) Lens Front Surface Data
(4) Lens Material Data
(5) Mold Frame Data
(6) Insert Data
(7) Multifocal Data The data fields for each of the above-listed data categories may be edited at step 210, or for new Projects which do not have data defined, the data may be entered at step 212 as follows:

Design Files (Select or Enter)
Project Name
Project Code
Product Name
Product Code
Product ID
Product Description
Designers Initials
Project Origin
Tooling Code
Mold/Frame Code
Design Revision This data entry, at step 214, sets the Project identifiers, and some of the fabrication facility choices to be used in calculating the lens design. For example, in selecting the tooling code, the designer is selecting the lathe to be used, and will be further constrained by the physical parameters of which the selected lathe is capable. The selection of Mold/Frame code determines the type of lens mold to be used in fabricating the lens.

Lens Back Surface Data

After entering the Project data, the next set of data to be entered is the data which will eventually determine the lens back curve, and this data is entered at step 216, and will vary primarily with respect to the user or wearer optical requirements. The program assumes three lens zones, a central optic zone, an intermediate optic zone, and a peripheral zone, which zones may vary significantly depending on the type of lens to be fabricated.

The entry of the lens back surface data at step 216 includes entry of the following choices and patient parameters:

(a) Posterior Central Optic Zone
Select one of the following design types:
0—spherical
1—aspheric
2—multifocal
3—toric
4—toric/multifocal
5—aspheric-toric
and, for the selected type of lens, enter the following parameters:
central optic zone diameter
sphere/BCradial difference
optic zone eccentricity
(b) Posterior Intermediate Zone
Select one of the following design types:
0—spherical
1—aspheric
2—toric
3—offset sphere
and, for the selected type of lens, enter the following parameters:
Intermediate curve radius
Intermediate curve diameter
Base curve shape eccentricity
Minimum lens thickness
(c) Posterior Peripheral Zone
Select one of the following design types:
0—No bevel
1—spherical
2—offset sphere
3—aspheric
4—reverse curve
and, for the selected type of lens, enter the following parameters:
bc bevel radial difference
edge flat width If the lens is a toric (astigmatic) lens design or a translating bifocal lens design, the design will include data entry for a slab-off zone to maintain lens orientation for the user or wearer. A representative example of such a lens design is provide in FIGS. 19(a)–(c).

(d) Posterior Slab-off Zones
Select one of the following design types:
0—No slab 1—double
2—single
If a slab-off design is selected, then the following parameters are entered:
  slab-off central diameter
  slab-off edge separation
  slab-off vertical edge clearance
The toricly oriented types of lenses include scribe marks for optometrist, ophthalmologist or clinician to use in fitting the lens, and the scribe mark data is entered as follows:
(e) Scribe Marks
Select one of the following design types:
0—none
1—horizontal
2—vertical
If a scribed design is selected, then the following parameters are entered:
  Scribe length
  Scribe width
  Scribe distance from edge
After entry of the data and optical parameters for the lens back surface as indicated at step 216, the data and lens parameters for the lens front surface is entered at step 218 as follows:
Lens Front Surface Data
  (a) Anterior Central Optic Zone
  Select one of the following design types:
  0—spherical
  1—aspheric
  2—multifocal
  3—toric
  4—toric/multifocal
and, for the selected type of lens, enter the following parameters, also at step 218:
  minimum optic zone diameter
  max optic zone diameter
  optic zone shape factor
  min optic zone junction thickness
  lensometer aperture—for power calculations
  toric zone axis
For multifocal and bifocal lenses, a transition zone is provided between optical powers, which may be entered at step 218 as follows:
  (b) Anterior Optical/Lenticular Transition Zone
    Transition/Blend Zone
  Select one of the following design types:
  0—No blend
  1—Spherical
  2—Rolling eight—adjacent spheres
  3—Sine squared/cos squared function
  4—Spline curve
It may be noted here that choices 1–4 above are contouring functions for smooth transitions. After the design choice is made, the following data is entered, also at step 218:
  Enter the following parameters:
    opt/lens transition zone diameter
    opt/lens transition radial difference from lentricular
At this point the design selections for the front curve of the lens follows the design selections and user optical parameters similar to that entered for the back curve surface of the lens, as follows:

(c) Lenticular Zone Styles
Select one of the following design types:
0—Spherical
1—Aspheric
2—Offset Sphere
3—Toric
(d) Anterior Peripheral Bevel Zone
Select one of the following design types:
0—No bevel
1—Spherical
2—Aspheric
3—Offset Sphere
For the selected type, the following parameters are entered:
  peripheral bevel width
  edge thickness at lenticular/bevel junction
Optical parameters for the user, or design parameters applicable to both lens surfaces may also be entered, as follows:
(e) General Features (total lens diameter)
Enter the following parameters:
  outside lens diameter
  edge chamber diameter
  peripheral bevel diameter
  polished edge diameter
  minimum center thickness
(f) Edge Details
Enter the following parameters:
  Anterior comfort chamfer
  Edge Fillet (anterior edge fillet)
  right cylinder wall height (edge height before chamfer)
  finished edge height
(g) Anterior Slab-off Zones
Select one of the following design types:
0—No slab
1—double
2—prism-ballast
3—toric
Enter the following parameters:
  slab-off central diameter between zones
  slab-off separation between zones
  slab-off vertical edge clearance
  prism diopters
(h) Scribe Marks
Select one of the following design types:
0—None
1—Horizontal
2—Vertical
Enter the following parameters:
  scribe length
  scribe mark width
  scribe distance from lens edge
  toric lenticular 180 deg. shape
  toric lenticular 90 deg. shape
Lens Material Data
  In addition to the optical needs of the users and the lens design parameters noted above, the lens design is constrained by parameters applicable to the fabrication facility, such as the refractive index of the polymerized monomer to be used, the type of mold and expansion characteristic of the mold material to be used, the expansion characteristics of the mold insert material and a variety of other factors, which are entered at step 220 as follows:

(a) Lens Material—material description
hydrated refractive index
material DK
lens material modulus (b) Expansion factors
mold lens expansion linear
mold lens BC radial expansion
mold lens FC radial expansion slope
mold lens FC radial expansion—intercept (c) Power Adjustment Factors
minus power adjustment factor
plus power adjustment factor
cylinder power adjustment factor linear slope
Add power adjustment factor linear slope While the present invention is particularly adapted to be used with a fabrication facility using the mol d halves depicted in FIGS. 1–4 of the drawings, it may also be used with other facilities and other mold designs, including the earlier mold design employed by the assignee of the present invention. This mold design is depicted in U.S. Pat. No. 4,565,348, and uses 8 contact lens molds attached to a surrounding frame. The use of this frame requires different factors for molding, such as shrinkage, than the factors employed for the mold halves of FIGS. 1–4. Thus, at step 222, the factors relating to the Mold type, and point of injection of the plastic are entered, as follows:

Mold/Frame Data (Plastic)

(a) Mold Frame [Mold process option]
Select one of the following design types:
0—Standard Frame
1—Center-gated
2—Single Lens Molds
Enter the following parameters:
mold/frame ID code
mold/frame Material
front mold ct
back mold ct
front curve mold outside diameter
base curve mold outside diameter
Ames radius
Ames gauge correction factor (b) Expansion/Shrinkage Factors
Enter the following parameters:
base curve insert tool to mold linear expansion
base curve insert tool to mold radial expansion
front curve insert tool to mold linear expansion—minus lenses
front curve insert tool to mold linear expansion—plus lenses
front curve insert tool to mold radial expansion—minus slope
front curve insert tool to mold radial expansion—minus intercept
front curve insert tool to mold radial expansion—plus slope
front curve insert tool to mold radial expansion—plus intercept As described in the present invention, lens mold may be formed with two different insert designs, and these inserts may be rough cut to approximate size before plating. This flexibility is accommodated in the program as follows:

Insert Data [Select or Enter inset tooling values]

(a) Base Curve Insert (Bc Type)
Insert tool Id code
insert tool material
base curve insert outside diameter
finger clearance
sag—cutoff to cutaway
insert tool plating thickness (b) Rear Core [input or calculated]
rear core—number of zones
rear core—central radius
rear core—central diameter
rear core—intermediate radius
rear core—intermediate diameter
rear core—peripheral radius
rear core—outside diameter (c) Front Curve Insert (FC Type)
Inset tool Id code
insert tool material
front curve insert outside diameter
FC inset edge chamfer radius
FC inset edge chamfer width
FC inset edge fillet
insert tool fillet radius
side wall angle
knife edge radius
knife edge correction
diamond tool radius
plating thickness (d) Front Core (Cores) [input or calculated]
front core—number of zones
front core—central radius
front core—central diameter
front core—intermediate radius
front core—intermediate diameter
front core—peripheral radius
front core—peripheral diameter The present invention is particularly useful in the preparation of multi-focal soft contact lenses, inasmuch as it can quickly generate the physical parameters of a plurality of optical zones for a wide variety of users. In this section of lens design, the optical requirements of those to be fitted with lenses may be blended with subjective experience, in determining the design of the lens. As noted at step 226 in FIG. 8 the CAD program of the present invention enables a number of design choices within the optical requirements dictated by the optical requirements of those who will sear the lenses, in which the design choices are input as multi-focal data, as follows:

Multifocal Data (a) Design Type
Select Multifocal Surface
Change number of multifocal zones (1-9)
Use Lower or Radius
concentric multifocal zone diameter
# of multifocal zones (1–9)
concentric multifocal power
concentric multifocal radius
concentric multifocal zone diameters

DESIGN

After the completion of the data entry for the Project, the design may be calculated and displayed as indicated at step 228, where from the Main Form the user can select the DESIGN command button which calculates a lens design based upon the previously input project data. The specifications of the generated lens design are displayed on the display screen, or printed out. FIG. 15 is a contact lens specification prepared by the program of the present invention, while FIG. 16 is a summary of the Design Input Data entered for the Contact lens specification illustrated in FIG. 15. These specifications were used in the preparation of the specifications for the lens mold inserts illustrated in FIG. 10 and 11, with the specification for the back curve insert illustrated in FIG. 11 being illustrated as FIG. 17.

Figure 11A:
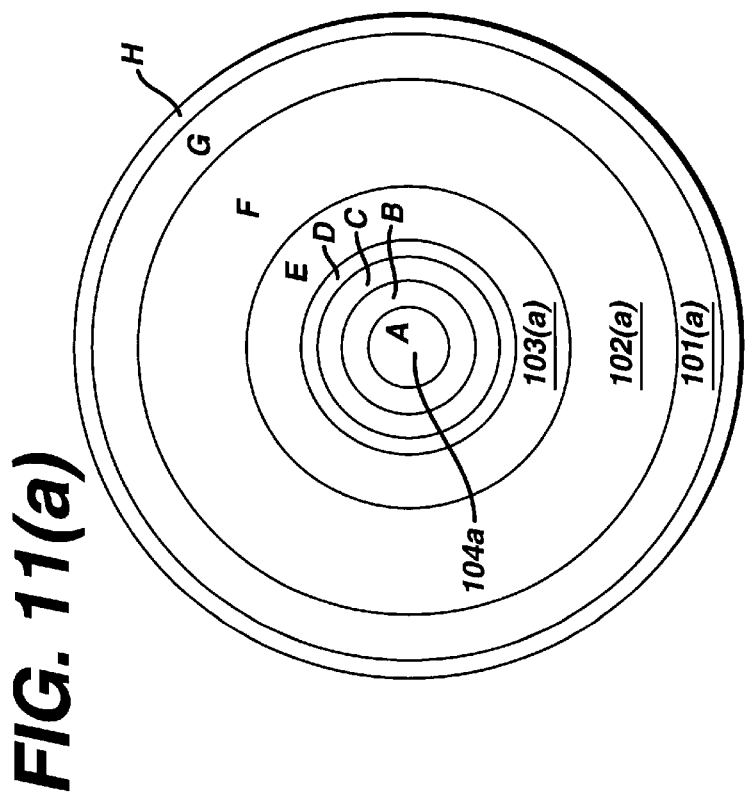
FIG. 11(a) is a front view of a multi-focal back curve insert produced in accordance with the present invention having a +1.5 near add power.
Figure 11C:
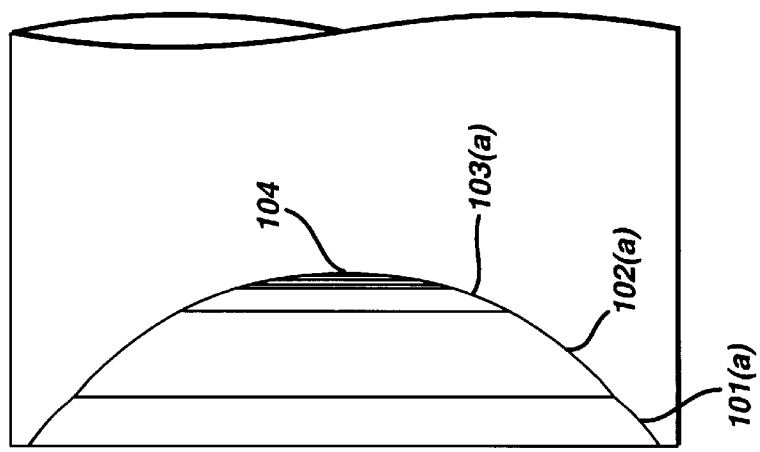
FIG. 11(c) is a diagrammatic view of the multi-focal front curve insert illustrated in FIGS. 11(a) and (b) illustrating the radius of curvature for the back curve surface of the lens to be produced.
Figure 11B:
FIG. 11(b) is a side view of the multi-focal front curve insert illustrated in FIG. 11(a) having a +1.5 near add power.

The program calculates, displays and prepares CNC data for the Project under the CHARTS step, which is step 234, available from the MAIN FORM window. The CNC data generated for the cutting of the back curve insert illustrated in FIG. 11 is attached hereto as FIG. 18. The command screen at step 234 has eight options as follows:

(0) Design Input Data Chart
(1) Lens Specification Chart
(2) Mold/Frame Specification Chart
(3) Base Curve Insert Tool Specification Chart
(4) Front Curve Insert Tool Specification Chart
(5) SKU Parameter Table
(6) Insert NC Lathe Data
(7) Lens Design Request Form In the diagrammatic illustration of the program found in FIG. 8, options 1–4 are found in the "Chart Specifications" node at step 260.

Option 0—Design Input Data

Input Design data is organized and printed in a chart. FIG. 16 is an example of such a printout from step 236. This step is not an input step, but a charting or printing step for the lens data currently in the program, and entered through 1step 204.

Options 1–4—Specifications

Figure 6:
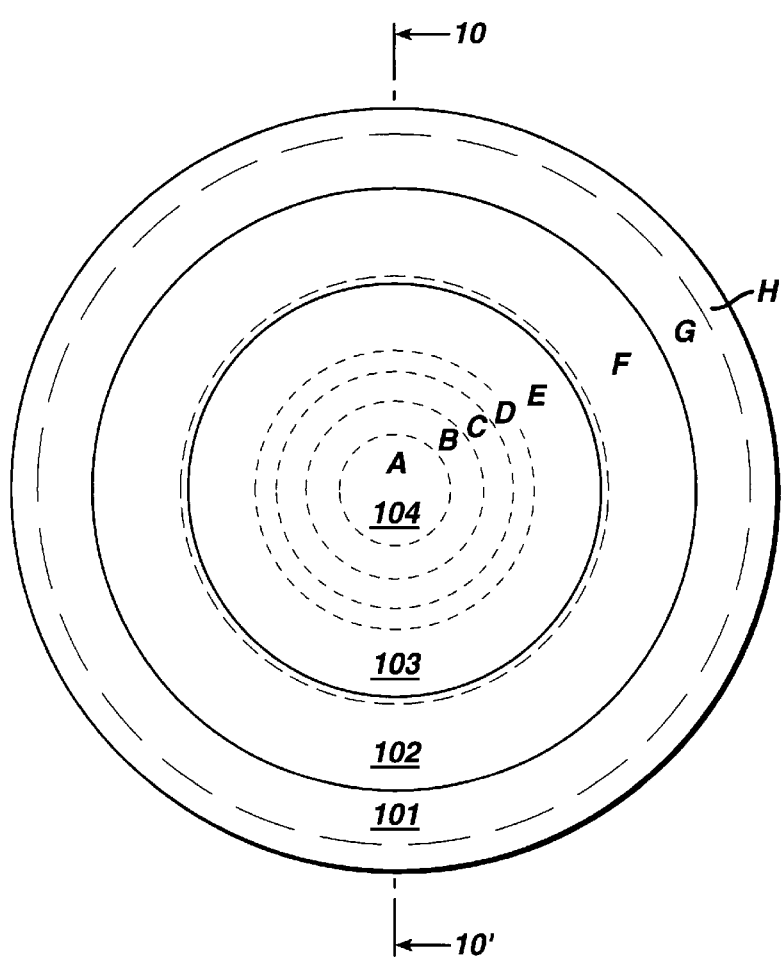
FIG. 6 is an enlarged diagrammatic front view of contact lens having a complex optical geometry, such as a multi-zone or bifocal contact lens.
Figure 7:
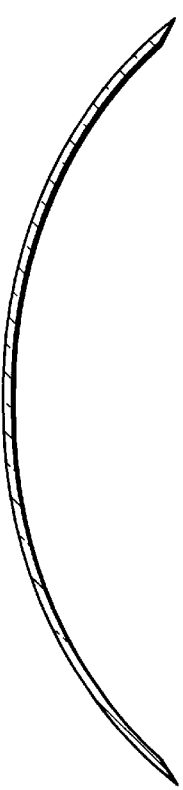
FIG. 7 is an enlarged cross section view taken along section line 10–10' of FIG. 6.

The CHART options enables the printing of a CHART of data, as typified by FIG. 15, which is a CHART for the specification of the contact lens illustrated in FIGS. 6 and 7.

Depending on the option selected (1–4), lens, mold/frame (plastic), base curve insert tool, or front curve insert tool specifications are calculated and printed in a chart, such as the chart for the back curve insert illustrated in FIG. 17.

For any of the four options, the first step is to calculate lens design parameters based upon the input design data and the selected lens design options (e.g. spherical, multifocal, toric etc.). Lens back surface parameters are calculated first, followed by lens front surface parameters. These calculation steps are invoked whenever the program of the present invention calculates a back curve surface or a front curve surface. The calculation steps are set forth below:

Calculate Lens Back Surface Parameters as noted at step 262 of FIG. 8 as follows:

(a) Determine Rotational Type—rotationally symmetric or not rotationally symmetric.
(b) Determine tool to mold expansion—calculate front core optical zone radial correction.
(c) Determine insert to lens expansion for back and front core.
(d) Determine insert to lens expansion for back and front core optical zone radial correction.
(e) Determine power adjustment for radius calculation—load lens power data if available and calculate power adjustment factors for molds and inserts.
(f) Calculate the Back Central Optic Zone having one of the preselected design types:

(1) Spherical
(2) Aspheric
(3) Multifocal
(4) Toric
(5) Multifocal-Toric
(6) Aspheric-Toric (g) Calculate Back Surface Intermediate Zone parameters.
(h) Calculate Back Surface Toric Zone, but only if the back central optic zone is Toric, Multifocal-Toric or Aspheric-Toric.
(i) Calculate Back Surface Peripheral Zone parameters having one of the preselected design types:

(1) No Bevel
(2) Spherical
(3) Aspheric
(4) Reverse Curve

Back surface peripheral Zone parameters include total back sagittal depth and volume, and equivalent base curve radius.

(j) Calculate the Back Surface Slab-Off Zone parameters, but only if slab-off zones are required.

Option 2 of the CHART options at step 234 involves the calculation of the lens front surface parameters as noted at step 264 of FIG. 8, as follows:

Calculate Lens Front Surface Parameters (a) Determine rotational type—Rotationally symmetric or not rotationally symmetric.
(b) Calculate Optic Zone Diameter.
(c) Adjust Back Surface for center thickness.
(d) If Optical/Lenticular transition zone is required, then calculate for one of the following optical zone types:
(1) Spherical
(2) Aspheric
(3) Multifocal
(4) Toric
(5) Multifocal-Toric Else No Optical/Lenticular transition zone, then calculate optic zone parameters for one of the following optical zone type:

(1) Spherical or Aspheric—Calculate front surface optic zone parameters including optic zone radius, sag, center and junction thickness; calculate lenticular zone parameters; and calculate peripheral zone parameters.
(2) Multifocal—Calculate front surface optic zone parameters including optic zone radius, sag, center and junction thickness; calculate lenticular zone parameters; and calculate peripheral zone parameters.
(3) Toric—Calculate lenticular radius for designs with minus power transition zones.
(4) Multifocal-Toric
(e) Calculate the Back Central Optic Zone (Bcoz) having one of the following preselected design types:
(1) Spherical
(2) Aspheric
(3) Multifocal
(4) Toric
(5) Multifocal-Toric
(6) Aspheric-Toric
(f) Calculate Knife Edge Zone.
(g) Calculate Edge Chamfer zone.
(h) Calculate Polished Edge Zone.
(i) Calculate Side-Wall Parameters.
(j) Calculate pc Zone.
(k) Calculate Lenticular Toric Zone.

(l) Calculate Slab-Off Zone.
(m) Calculate Zone Sags.
(n) Calculate Front Surface Volume.
(o) If back surface is Aspheric-Toric, then calculate posterior optic zone diameters.
(p) If Slab-Off is required, then calculate slab-off junction thickness.
(q) Calculate "Hydrated" Insert and Mold parameters.
(r) Calculate Front Core Insert parameters.
(s) Ames Gauge Reading.
(t) Set Power Label.

After the lens front and back surface parameters are calculated the resulting data may be displayed and printed in chart format as noted at step 266 of FIG. 8.

Option 5 of the CHART options is used to provide an SKU number from the SKU Parameter Table for use in manufacturing, packaging, and inventory control of the lens to be produced. When this option is selected at step 234, the SKU number may be found or the parameters may be entered at step 268 as follows:

SKU Parameter Table—Enter or display a stock keeping unit for a lens design group.

Option 6 of the CHART options, at step 238 is used to prepare CNC data for driving a CNC lathe, and in the present invention, may be a single diamond point turning lathe, such as that hereinafter described, or may be a conventional cut, grind and polish lathe. For example, the Moore lathe described in this application is capable of either functionality. This enables use of the program of the present invention to calculate and cut mold inserts for contact lens molds having conventional optical surfaces. However, before these calculations are prepared, step 238 described in FIG. 8 requires the entry of certain parameters relating the lathe type, and lathe capabilities. This data is entered in step 238 as follows:

Option 6—Insert NC Lathe Data

If this option is selected, then the NC Lathe Data Options form is displayed and the following steps are initially performed.

(a) Select Insert Type—If the surface design is non-rotationally symmetric (e.g. toric, toric-multifocal or aspheric-toric) then disable the Moore lathe option and enable the Astigmatic lathe option. Else, the surface is rotationally symmetric (e.g. spherical, aspheric or multifocal), thus enable the Moore lathe option.

(b) Select a Lathe—Astigmatic or Moore (if available).

(c) For Astigmatic Lathe select one of the following Astigmatic file options:
  (1) main profile,
  (2) astigmatic profile, For the Moore Lathe, set the Astigmatic file option to Main Profile.

(d) Fill Text Boxes
(e) Determine NC Lathe Offsets.
Determine data file name.

After the initial steps are performed the user has the option to select OK (a command button) which instructs the program to accept the NC Data File options, calculate lens parameters, and generate and print NC Lathe Control Data. The lens parameters are calculated as described in steps 262 and 264 (i.e. back surface parameters first, then front surface parameters). The NC Lathe Control Data is determined in accordance with one of the selected Astigmatic Lathe File Options as detailed below.

MAIN PROFILE

For the Main Profile at step 242 of FIG. 8, NC Lathe Control Data can be generated for both back and front surfaces.

NC Back Surface Lathe Data—Determine NC Back Surface Lathe Control data for either Astigmatic or Moore Lathes.

I. Astigmatic
(A) Chart general lathe data including the following:
    Macro Number
    Design ID
    Data File Name
    Date
    Diameter
    Start Position
    Change tool position
    Absolute Dimensions
    Fast Feed Rate
    Insert Diameter
    Cut Feed Rate
    Finish Outside Diameter
    Angle In
(B) Determine and Chart NC Lathe rough cut data for peripheral, intermediate and optic zone.
    (1) General Data
        Change tool position
        absolute dimensions
        reset x position at semi-diameter offset
        fast feed rate
        move to z start position
        cut feed rate
    (2) Determine and Chart Peripheral Zone Data If Lbvr<>Lbcr then determine:
        first x-position
        bevel x, z, radius
    (3) Determine and Chart Intermediate Zone Data
        If no Bevel, recalculate first xposition.
        If back surface is non-symmetrical recalculate tx.
        Determine sag at intermediate bcoz junction
        Chart intermediate x, z, radius
    (4) Determine and Chart Optic Zone Data according to the pre-selected Optic Zone Type
        (a) Sphere
            Determine full insert sag
            Determine optic zone x, z, radius
        (b) asphere
            Determine number of optic zone divisions
            Determine optic zone x, z, radius
        (c) multifocal
            Determine cumulative sag
            Determine optic zone x, z, radius
        (d) toric
            Determine full insert sag
            Determine cylinder x, z, radius
        (e) multifocal-toric
    (5) Chart return to Z clearance position
(C) Determine and Chart NC Lathe finish cut data for peripheral, inteinediate and optic zone.
    (1) Chart General Data
        Change tool position
        absolute dimensions
        reset x position at semi-diameter +offset
        fast feed rate
        move to z start position
        cut feed rate
    (2) Determine and Chart Peripheral Zone Data If Lbvr<>Lbcr then determine:

first x-position
bevel x, z, radius
(3) Determine and Chart Intermediate Zone Data
If no Bevel, recalculate first xposition.
If back surface is non-symmetrical recalculate tx.
Determine sag at intermediate bcoz junction
Chart intermediate x, z, radius
(4) Determine and Chart Optic Zone Data according to the pre-selected optic zone type
  (a) Sphere
    Determine full insert sag
    Determine optic zone x, z, radius
  (b) asphere
    Determine number of optic zone divisions
    Determine optic zone x, z, radius
  (c) multifocal
    Determine cumulative sag
    Determine optic zone x, z, radius
  (d) toric
    Determine full insert sag
    Determine cylinder x, z, radius
  (e) multifocal-toric
(5) Chart return to Z clearance position
(D) Determine and chart Knife edge codes
(E) Determine and chart toric-astigmatic codes
(F) Determine and chart slab-off codes
NC Front Surface Lathe Data Determine NC Front Surfaces Lathe Control Data for either Astigmatic or Moore Lathes.
I. Astigmatic
(A) Chart general lathe data including the following:
  Macro Number
  Design ID
  Data File Name
  Date
  Diameter
  Start Position
  Start Z position
  Change tool position
  Absolute Dimensions
  Fast Feed Rate
  Insert outside Diameter
  Cut Feed Rate
  Finish Outside Diameter
  Cut lower shoulder and out
(B) Determine and Chart Chamfer, peripheral bevel (lenticular #2), lenticular, transition and optic zone data
  change tool position by L2
  absolute dimensions
  reset x position at semi-diameter+offset
  fast feed rate
  move to z start position
  cut feed rate
  (i) Determine and Chart Lead-in Radius
    Z position
    radius
  (ii) If Chamfer is required, then determine and chart
    first x-position
    lead-in x, z, radius
    chamfer x, z, radius
  (iii) If Peripheral Bevel Zone is required, then determine and chart
    first x-position
    lead-in x, z, radius
    bevel x, z, radius
  (iv) If lenticular zone is required, then determine and chart,
    first x-position
    lead-in x, z and radius
    lenticular x,z and radius
  (v) If transition/blend zone is required, then for:
    Case 1—Spherical
      Determine and chart transition x, z and radius
    Case 2—Rolling eight
      Determine and chart transition #1 x, z and radius
      If necessary determine and chart transition #2 x, z and radius.
    Case 3—Sine-squared
  (vi) Determine and Chart optic zone x, z and radius for the selected optic zone type including sphere, asphere, multifocal, toric and multifocal-toric.
  (vii) If Edge Fillet is required, then determine and chart fillet x, z, and radius
  (viii) Determine and chart sidewall
  (ix) Determine and chart,
    knife edge x, z and radius
    exit to diameter
    trim diameter 0.5mm
    move away from insert
  (x) toric optic zone
  (xi) If slab-off zones are required, then determine and chart
    change tool position by L2
    absolute dimensions
    move to x
    fast feed rate
    move to z
    cut feed rate
    lead-in x, z, radius
    slab x, z, radius
If the lathe to be used is a Moore lathe, then the Moore Lathe option is selected as noted at step 250, and the NC data for the Moore lathe is calculated at noted in steps 252(*a*) –252(*d*). The present invention is intended for use with a variety of lathes, and it is to be noted that separate calculations are required whenever the format of the NC data, or the command parameters for a selected lathe are different that the format or command parameters available for the astigmatic lathe used in the preferred embodiment of the invention. When a Moore lathe is to be used, the following calculations are preformed at step 250 et seq.:
  (i) Determine and chart shoulder and flange control information including:
    start position
    move to insert
    move to outside diameter
    move to full sag
  (ii) Determine Diamond Tool Start Point for optical surfaces having an edge radius which allows for finishing with 15 um diamond. Determine and chart large and small diameters, sag at large and small diameters, and feed rate.
  (iii) Determine and chart peripheral bevel zone large and small diameters, and sag at large and small diameters.
  (iv) Determine and chart lenticular zone large and small diameters, and sag at large and small diameters for transition blend zone, else for one of the following optic zone types:
    (a) sphere,
    (b) asphere,
    (c) multifocal,
    (d) toric or (e) multifocal-toric.
(v) Determine transition/blend zone large and small diameters, and sag at large and small diameters, if required, for one of the following optic zone types:
  (a) sphere,
  (b) asphere,
  (c) multifocal,
  (d) toric or
  (e) multifocal-toric.
(vi) Determine optic zone large and small diameters and sag at large and small diameters for one of the following optic zone types:
  (a) sphere
  (b) asphere
  (c) multifocal—for each multifocal zone
  (d) toric
  (e) multifocal-toric In the event the lens designs requires a toric or astigmatic correction, or if it is desired to use the astigmatic lathe with the plated inserts and the single diamond point turning, as for example, for the preparation of mold inserts for the molding of annular bifocals discussed with respect to FIGS. 10 and 11, then the Astigmatic Profile option is selected at step 238, and the selection invokes the CASE 1 and CASE 2 choices available at step 240. At step 240, the program generates the following NC data to generate Astigmatic Lathe control data for cutting the mold insert that will form, for non-toric lenses, the back surface of the lens, as indicated at step 244, and then the front surface, as indicated at step 246. For toric lenses, the same data will be calculated at steps 244(a) and 246(a):

FOR EACH LENS SURFACE (Steps 244, 246 and 244a, b)
  calculate tool sag(hydrated
  print chart header
  Build astigmatic lathe file
  macro number
  data file name
  date
  turn spindle on
  turn vacuum on
  set astigmatic trigger
  reset astigmatic control
  copy file from ELPS to astigmatic
  disable product angle offset
  rpm correction increment
  tool position: 2
  mist
  ZDAT2
  Determine inside pre-cut contour setup
    calculate toric cut dimensions
      calculate sphere semi-diameter
      calculate sag at semi-sphere diameter
      calculate sag of cylinder radius at sphere semi-diameter
      calculate mid sag
      calculate intermediate curve parallel radius
      calculate parallel curve x-axis offset
      calculate parallel semi-diameter
      calculate parallel curve sag
      calculate mid diameter, sag
      calculate mid radius
      calculate lead-in diameter, radius
      calculate slope of straight line connecting lead-in and mid-positions
      calculate intermediate of straight line connecting lead-in to mid position
      calculate normal to straight line
      calculate lead-in radius
      calculate lead-in x-axis offset
      calculate lead-in y-axis offset
      calculate lead-in x
      calculate lead-in z
    load file
    check astigmatic file ID
    enable RPM correction
    store reference position
    set astigmatic flag
    reduce ramp down speed
    command new speed
    switch astigmatic on
    air on
    liquid on
  Determine codes for inside contour including:
    start x
    x
    z
    K
    lead out x
    lead-out z
    lead-out radius
    clear surface
    disable RPM correction
    deactivate astigmatic
    liquid off
    air off
    return to z-clearance position
  Determine control commands for inside finish cut including:
    tool position
    mist
    ZDAT2
    shift
    load file
    check astigmatic file ID
    enable rpm correction
    store reference position
    set astigmatic flag
    reduce ramp down speed
    command new speed
    switch astigmatic on
    air on
    liquid on
  Determine command codes for inside contour including:
    CALCULATE Toric cut Dimensions
    start x
    x
    z
    K
    lead out x
    lead-out z
    lead-out radius
    clear surface
    disable RPM correction
    deactivate astigmatic
    liquid off
    air off
    return to z-clearance position
  Reset
    total inserts
    jump to end
    set line counter vacuum off
spindle off
program end After the back and the front surface data has been generated, the NC lens data may be charted, as noted at steps 248 and 248(a) of FIG. 8. A representative sample of such a chart is included as FIG. 18. This chart contains the NC data, prepared by the program used in the present invention, for the cutting the mold insert depicted in FIG. 11, that was used to prepare the back curve mold, to mold the back surface of the lens depicted in FIGS. 6 and 7.

THE LENSES

The use of computer controlled diamond point turning allow the creation of complex geometric forms, such a bifocal, aspheric toric, parabolic and elliptical geometry, not commercially feasible with conventional tool and die "grind, polish and inspect" technology.

For example, FIG. 6 illustrates in front view a multi-ring bifocal contact lens having a series of concentric multi-focal zones with smooth transition zones. Such a contact lenses is highly useful as a bifocal contact lens, as taught in U.S. Pat. No. 5,448,312 Multifocal Ophthalmic Lens assigned to the assignee of the present invention. FIGS. 19(a)–(c) illustrate a lens for correction of astigmatism having slab-off zones to maintain a predetermined orientation of the lens on the cornea of the wearer.

The cross section of the lens in FIG. 6 is illustrated, approximately to the same scale in FIG. 7, where it is apparent that the smooth transitions between powers of concentric rings are extremely subtle. In the actual lens, some of these transitions are in the micron range.

Figure 10C:
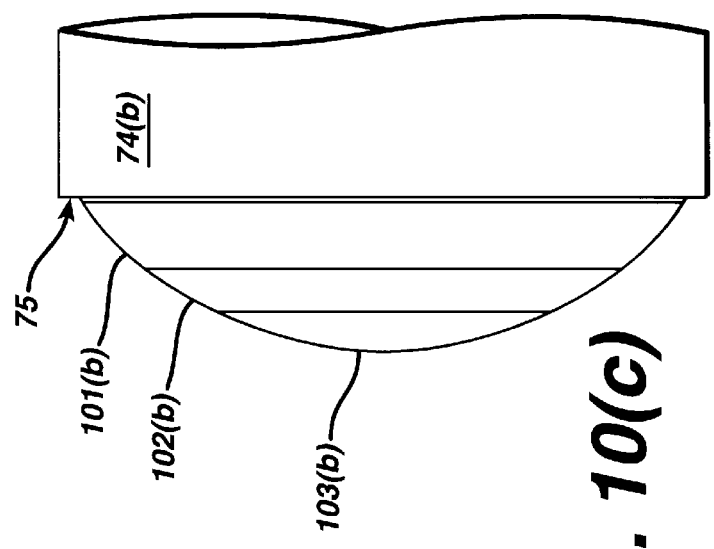
FIG. 10(c) is a diagrammatic view of the multi-focal front curve insert illustrated in FIGS. 10(a) and (b) illustrating the radius of curvature for the front curve surface of the lens to be produced.
Figure 10A:
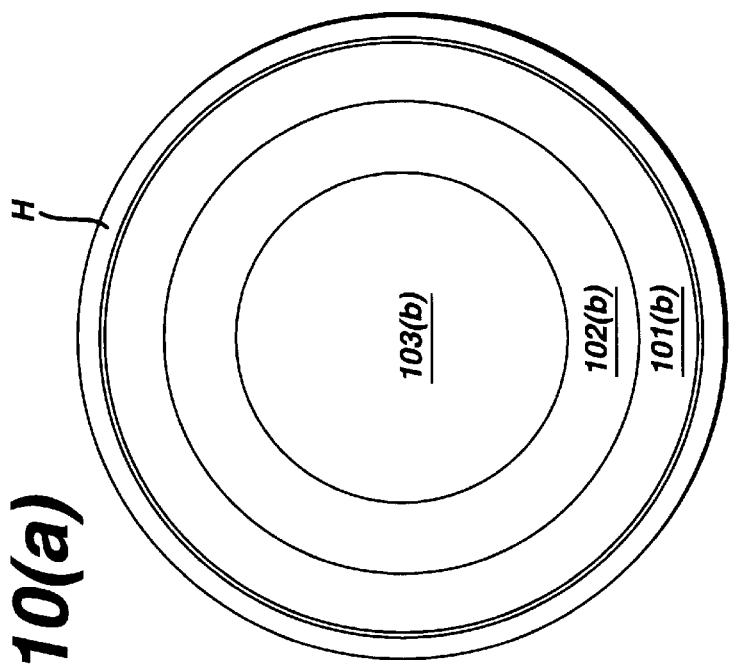
FIG. 10(a) is a front view of a multi-focal front curve insert produced in accordance with the present invention having a −3.00 distance power.
Figure 10B:
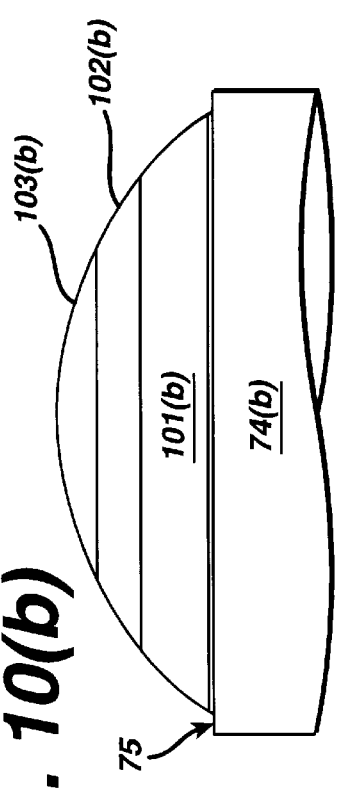
FIG. 10(b) is a side view of the multi-focal front curve insert illustrated in FIG. 10(a) having a −3.00 distance power.

FIGS. 10(a)–(c) illustrate a front curve insert and 11(a)–(c) illustrate a back curve insert, which together form a pair of lens mold inserts formed in accordance with the present invention, which were used to form the front and back curve lens molds used for the lens depicted in FIGS. 6 and 7. Each of the annular optical zones 101–104 is formed with a different radius on the face of the lens with smooth transitions therebetween.

With respect to FIGS. 6–11, the lens, and the inserts which mold the surfaces which form the lens, will be described together, with like reference numeral, where the numeral alone refers to the lens, the numeral with an (a) suffix refers to the back curve forming insert, and the numeral with a (b) suffix refers to the front curve forming mold insert.

As illustrated in FIGS. 6–11, the lens is a concentric bifocal lens, with annular concentric alternating near add powers (a +1.50 near add) formed on the back surface and a distance power (a –3.0 distance) formed on the front surface to provide alternating bands of near and distance power corrections as taught in U.S. Pat. No. 5,448,312, entitled "Multifocal Ophthalmic Lens", assigned to the assignee of the present invention, the disclosure of which is incorporated herein by reference thereto. A detailed specification on this lens design, produced by the aforedescribed computer program is illustrated in attached FIG. 15.

This lens varies the near add power as a function of luminance, with the center zone 104 (also zone A) being a –3.0 distance power; the center optic zone 103 (B–E) alternating between near add and distance powers as denoted by zones B–E (and including as a function of the ratio of near and distance powers, center zone 104), with zone 102 (F) being a distance power. Zone 101 (G and H) is a peripheral zone. The front curve insert has a single central optical zone 103(b) which provides a base –3.0 distance correction for the lens. In the central optic zone 103 of the back curve insert, the ratio of powers varies as the pupil diameter varies in response to luminance, with zone A, (smallest pupil diameter) intended for activities under maximum illumination, such as noon-day outdoor vision, with zone B introducing sufficient near add, that the combined total of zones A and B is from 50% to 70% near add, for normal indoor activities, such as reading or close work. Zone C relaxes the near add, to maintain some distance acuity, while zone D increases the near add function to assist in low level light activity such as reading in low light levels. Finally, the outer portion E of the central optic zone 103 returns to distance for outdoor night time activities. The outer peripheral zone 101 includes a beveled portion H to aid in maintaining tear flow under the lens.

Attempts to fabricate sets of mold inserts with all the variations of near and distance powers, with conventional technology has proven to be extremely difficult, since the polishing step of the conventional grind, polish and inspect lathe operations easily obliterates much of the fine subtle gradations inherent in zones A–F on the back surface insert illustrated in FIG. 11.

However, the combination of the diamond point turning with plated inserts makes it possible to generate substantial numbers of nearly identical power inserts having complex geometries. This geometry is calculated and created in "meta-space" in three dimensional mathematical models in the computer aided design program (CAD) of the present invention, and transferred to computer aided manufacturing program (CAM) in order to programmably guide the diamond point turning of the lens insert.

The toric lens design illustrated in FIGS. 19(a)–(c) includes a central optic zone 103(d) which may be a distance correction or a multi-focal distance/bifocal correction as previously described with respect to FIGS. 6 an 7. This design includes a toric correction, as noted at 105, with the toric correction denoted at 105(a). This design also includes a pair of slab-off zones 108(a),(b) in which the thickness of the peripheral zone has been modified to enable a predetermined orientation of the lens on the eye of the user. As can be seen by comparing the horizontal cross section of FIG. 19(b) with the vertical cross section of FIG. 19(c), it can be seen that the slab-off zones 108(a),(b) are substantially thinner than the remainder of the lenticular zone indicated at 106. This lens design also includes an outer peripheral zone 101(d) having a taper to assist in tear flow for the lens.

Hard contact lenses are normally custom cut for each individual wearer or user. However, molded soft contact lenses are produced on a mass production basis, in which thousands of lenses of each type are molded with each change of mold inserts. Placing the distance powers on the front curve insert and the various near add powers on the back surface minimizes the number of sets of inserts needed for each molding machine, and provides maximum flexibility in varying production to meet user demands.

DIAMOND POINT TURNING

Diamond point turning is conventionally used to machine contact lens blanks without the need for polishing the lens, but it is not used in the manufacture of soft contact lenses. These lathes provide an accuracy of 20 nm and a resolution of 10 nm with an absolute shape accuracy that is better than 1 micron. The surface roughness, when used with >0.1 micrometer diamond, provides a surface roughness that is optically smooth (Ra >0.03 $\mu$m).

While there are a number of precision lathes capable of providing the required precision and surface smoothness, one such diamond point turning apparatus that is suitable for use in the present invention is the Optomatic Lather® manufactured by Europrecision Technology, DV, located at 7550 BD Hengelo in the Netherlands. This unit provides an X axis slide with hydrostatic bearings, a laser optical linear measuring system having a 0.005 micron resolution and a linear friction drive system. The spindle unit for this lathe is equipped with air bearings and uses a linear friction drive in the Z stroke. This lathe is capable of cutting spheric, aspheric or multicurve shapes on both sides of a hard contact lens and has submicron tolerances in each of the major systems which results in high performance for surface roughness, form and waviness accuracy which avoids the need for polishing the contact lens. The software programs (CAM) provided with this device may be interfaced with the computer assisted design (CAD) program described above. It should be noted that the reference to this lathe is exemplary only, and not to imply that the invention is limited to practice with this apparatus.

FRONT CURVE AND BACK CURE MOLD HALVES

Figure 3:
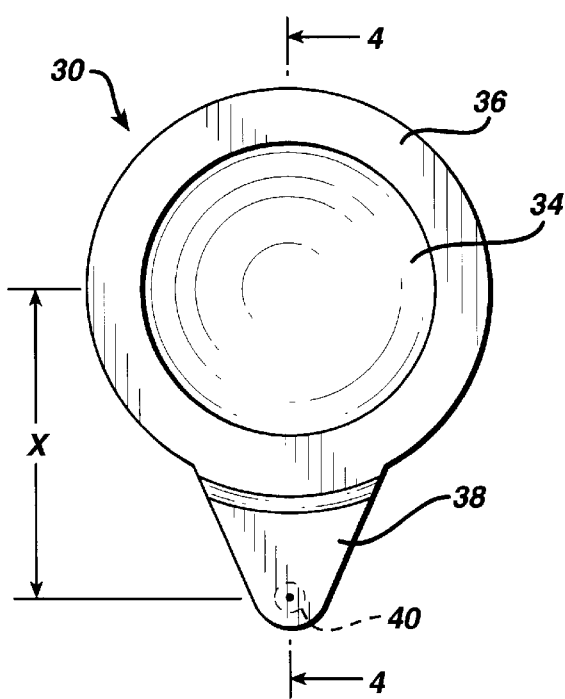
FIGS. 3 and 4 are respectively top elevational and side sectional views of one embodiment of a back (male) mold half which is produced pursuant to the present invention.
Figure 4:
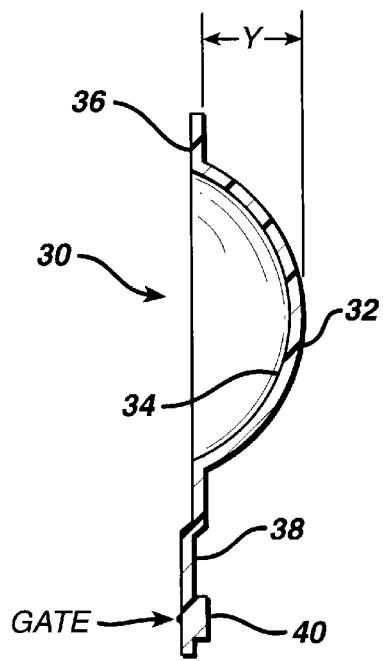
Figure 5:
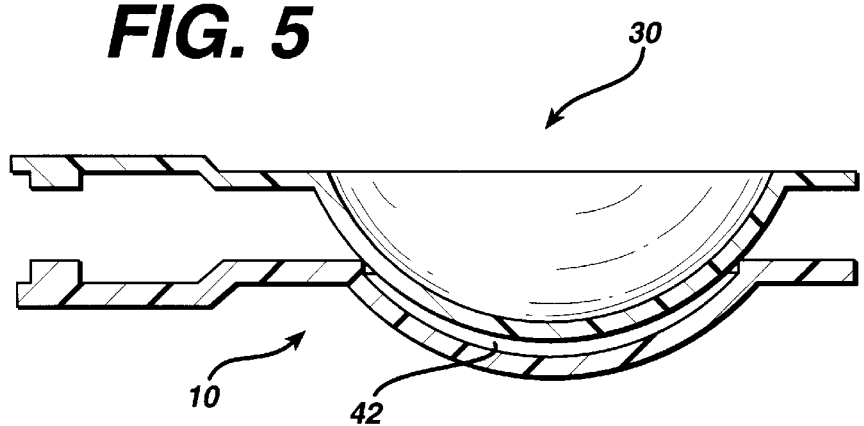
FIG. 5 is a side elevational sectional view of a mold assembly which includes a front mold half and a back mold half.

The front and back curve mold halves used to mold the lenses formed with the present invention are illustrated in FIGS. 1–5, which depict in detail the front mold half 10, the back mold half 30, and the pair assembled for molding in FIG. 5.

The front mold half 10 defines a central curved section with an optical quality concave surface 12, which has a circular circumferential well defined edge 14 extending therearound. The edge 14, shown in detail A of FIG. 2, is desirable to form a well defined and uniform plastic radius parting line (edge) for the subsequently molded soft contact lens. The well defined edge 14 actually has a very small curvature which can be in the range of 3–45 um, or less preferably 5–30 um, and the surfaces defining the edge can form an angle in the range of 75°–90°. A generally parallel convex surface 16 is spaced from the concave surface 12, and an annular essentially uniplanar flange 18 is formed extending radially outwardly from the surfaces 12 and 16. The concave surface 12 has the dimensions of the front curve (power curve) of a contact lens to be produced by the front mold half, and is sufficiently smooth such that the surface of a contact lens formed by polymerization of a polymerizable composition in contact with the surface is of an optically acceptable quality. The front mold half is designed with a thickness to transmit heat therethrough rapidly (typically in the range of 0.4 to 1.2 mm, preferably in the range of 0.5 to 1.0 mm, and most preferably in the range of 0.6 to 0.8 mm, and in one embodiment was selected to be 0.8 mm) and rigidity to withstand prying forces applied to separate the mold half from the mold assembly during demolding.

The front mold half or curve thickness was reduced from 1.5 mm in prior designs to 0.8 mm. This had a direct impact on cycle time reduction. Using a one dimensional heat flow, the cooling differential equation is:

$$\frac{\partial T}{\partial t} = a \frac{\partial^2 T}{\partial^2 t} \quad a = \frac{k}{eCp} = \text{thermal diffusivity}$$

$$\text{cooling time} = \frac{-t^2}{\pi^2 a} \ln \frac{4T\text{melt} - T\text{mold}}{T\text{demold} - \text{temp} - T\text{mold}}$$

The thermal diffusivity is proportional to specific heat, thermal conductivity, density. The cooling rate is determined by the thermal diffusivity of the material. The higher the thermal diffusivity, the faster the cooling rate.

The front mold half or curve 10 further defines a tab 20 integral with the flange 18 which projects from one side of the flange. The tab 20 extends to the injection hot tip (by the notation GATE) which supplies molten thermoplastic to the mold. The gate diameter is typically in the range of 0.4 to 1.4 mm, preferably in the range of 0.6 to 1.2 mm, and most preferably in the range of 0.8 to 1.0 mm, and is selected to result in minimal shear stress in the molten thermoplastic which is injected. Control of the gate size also helps to control the flow rate of the molten thermoplastic, which (in conjunction with temperature and rate of heat removal) helps control the final dimensional characteristics of the molded part and optimizes the processing of the molded part. The optimum size of the gate is calculated by considering the material flow index of the thermoplastic polymer, the wall thickness, part volume, an also considering the hot runner tip temperature and mold temperature.

The injection point feeds into a planarizing zone which fulfills several important functions. The planarizing zone is generally thin and flat, preferably having the same thickness as the rest of the mold cavity. The planarizing zone preferably is generally triangular, having an apex near which the injection gate point feeds molten thermoplastic into the planarizing zone. The planarizing zone diverges gradually in width from the apex region toward the rest of the mold cavity. Where the planarizing zone intersects the flange portion of the mold, the width diverges more, preferably uniformly from both sides of the zone. Thus, the planarizing zone is preferably symmetrical about the plane formed by the injection point and the axis of the concave surface of the molds.

One function of the planarizing zone is planarizing the flow of the injected molten thermoplastic into a smoothly steadily advancing flow of material filling the zone and feeding directly into the flange and concave-convex regions of the mold. Controlling the flow characteristics imparted by the dimensions of the planarizing zone, in conjunction with the feed pressure, flow rate, and temperature of the molten thermoplastic and the rate of heat withdrawal therefrom, enables obtaining the desired characteristics of the completed mold half.

The planarizing zone also serves to form the tab 20 which is integral with the rest of the completed mold half and is an essential part of that article.

The tab 20 defines therein an angled (e.g., 45°) web section 22, which is included in the design to break up the flow of molten thermoplastic in the molding process prior to the flow entering the optical quality portion of the mold. A step is created in the tab to break the polymer flow and smooth out the advancing melt flow, thus reducing and preferably eliminating jetting of the flowing molten thermoplastic which could lead to sink marks, dimensional inconsistency, and unacceptable irregularities in the surface of the molded mold half. The step forces a reversal of the melt momentum back to the start. This in turn causes the polymer to form an advancing front which fills the cavity more smoothly. This also moves the air in the mold cavity towards the vent lines and results in an optical part free of weakness lines, thus producing a dimensionally superior part.

Vent lines are provided in the mold to assist in removing air therefrom and preventing possible melt flow stagnation. In a preferred embodiment, the vent lines are provided outside and spaced around the annular flange at locations spaced furthest from the mold gate. If this concept is not properly engineered, the flange opposite the hot runner side can have weld lines at the converging melt flows. The hot runner gate is positioned, and the tab is designed, to allow for even and uniform polymer flow so that the advancing polymer flow does not produce weld lines, which are a source of surface imperfection, mechanical stress, and a point of weakness.

Moreover, the front mold half 10 also defines a small circular projection 24 which is positioned across from the injection hot tip which supplies molten thermoplastic to the mold. The projection 24 functions as a trap to immobilize a small slug of cold thermoplastic which may form at the injection hot tip between molding cycles. The plastic well immobilizes a small slug of cold thermoplastic which may form at the injection hot tip between molding operations, and essentially captures the initial melt flow from the hot runner gate tip. Thus, the well 24 is positioned adjacent to the point at which the molten thermoplastic is injected into the mold. Preferably, the well 24 is directly across from that point, the better to catch the first injected thermoplastic. It is imperative that during initial injection this mass of cold polymer be trapped in the cold well and not enter the melt stream. This could cause part dimensional variations due to melt temperature and possible shrinkage variation, jetting, and freezing of the melt flow. Variations of the tab length in conjunction with the size of the cold well can vary, for example, with a longer tab length and smaller cold slug well.

The location of the hot runner gate on the tab with respect to the optical surface ensures minimal heat distortion and part dimensional stability. The location of the gate and tab geometry is designed to prevent polymer jetting (which causes marks and dimensional variations). When the melt flow hits the cold slug plane and then the step 22, impinging occurs which smooths out the melt flow. The abrupt transition at the step prevents transportation of a cold surface layer into the rest of the mold. The radius at the transition step and divergence angle of the tab, in conjunction with the flow rate and the injection pressure, results in a laminar flow of the melt flow into the optical cavity and prevents the jetting phenomena. The cold slug well opposite the gate captures the first part of the polymer stream, which allows a more homogeneous melt front which relates to optical quality.

The design of the flange 18 helps demolding and part handling, and also protects the optical surfaces and the well defined edge as described earlier. The geometry of the tab 20 serves an additional function in straightening and orientating the assembled front curve/back curve prior to demolding. When a front mold half or curve is assembled with a back mold half or curve, a gap is formed between the two projecting tabs which is important for demolding. The gap between the tabs typically has a range of 0.5 to 3.0 mm, preferably has a range of 1.0 to 2.5 mm, and most preferably has a range of 2.0 to 2.25 mm and is needed to initiate the demolding operation.

A finite element analysis enabled a better design of the part geometry from the following points:
  hot runner gate location;
  filling time for cycle time reduction;
  weld lines, air traps, flow direction;
  ease of filling the mold;
  shear rate, shear stress and temperature profiles;
  cooling requirements.

This type of analysis based on fluid dynamics (rheology) and thermodynamics is used to give approximations for momentum and energy of the melt flow.

The flow length distance of the polymer has been significantly reduced relative to prior designs, which greatly enhances the ability to optimize the optical attributes. There is lesser probability of freezing the flow passageway as mold temperatures are reduced further to improve cycle time. One unexpectedly advantageous aspect of the present invention is that operations are carried out at higher thermoplastic temperatures while still realizing successful production within shortened cycle times.

FIGS. 3 and 4 illustrate respectively top elevational and side views of one embodiment of a back mold half 30. The back mold half 30 is designed with all of the same design considerations mentioned hereinabove with respect to the front mold half 10.

The back mold half 30 is also preferably formed of polystyrene, but could be any suitable thermoplastic such as mentioned hereinabove in the family of thermoplastics. The back mold half 30 defines a central curved section with an optical quality convex surface 32, a generally parallel concave surface 34 spaced from the convex surface 32, and an annular essentially uniplanar flange 36 formed extending radially outwardly from the surfaces 32 and 34. The convex surface 32 has the dimensions of the rear curve (which rests upon the cornea of the eye) of a contact lens to be produced by the back mold half, and is sufficiently smooth such that the surface of a contact lens formed by polymerization of a polymerizable composition in contact with the surface is of optically acceptable quality. The back mold half is designed with a thickness to transmit heat therethrough rapidly (typically in the range of 0.4 mm to 1.2 mm, preferably in the range of 0.5 to 0.8 mm, and most preferably in the range of 0.6 to 0.8 mm, and in one embodiment was selected to be 0.6 mm) and rigidity to withstand prying forces applied to separate the mold half from the mold assembly during demolding.

The back curve is designed with a back curve sag typically in the range of 1.5 to 6.5 mm, preferably in the range of 2.5 to 6.0 mm, and most preferably in the range of 5.1 to 5.8 mm (see FIG. 4 for the predetermined sag, dimension "Y"). The back curve sag and above specified ranges of thickness serve two purposes:

1. The back curve sag results in a gap typically in the range of 0.5 to 3.0 mm, preferably in the range of 1.0 to 2.5 mm, and most preferably in the range of 2.0 to 2.25 mm between the assembled back curve and front curve, which assists in mechanically removing the back curve from the front curve matrix after polymerization.

2. With a part thickness in the above specified ranges, the back curve was designed to reduce the occurrence of weld lines on the distal side of the flange (where two melt flows converge) which could detrimentally cause a fracture line on the back curve.

The back mold half or curve 30 also defines a tab 36 integral with the flange which projects from one side of the flange. The tab 36 extends to the injection hot tip which supplies molten thermoplastic to the mold, and also defines therein an angled (e.g., 45°) section 38 for the same reasons as in the front mold half 10. The back mold half 30 also defines a small circular projection 40 for the same reasons as in the front mold half 10.

The tab design length "X," FIG. 3, is important for the following reasons:
  minimizes heat distortion to the optical side of the part;
  the location and the distance are important;
  consistency of roundness for optical power radius;
  cycle time reduction;
  length X can vary typically in a range of 10 to 30 mm, preferably in a range of 12 to 26 mm, and most preferably in a range of 16 to 24 mm.

To achieve a minimized molding time, the thickness of each mold half should be reduced as much as possible, while considering other design constraints such as the desired rigidity of each mold half. In general, the back mold half 30 should be more flexible than the front mold half 10 and so is slightly thinner. The thickness of the front mold half 10 is thinner than a comparable prior art mold half which generally had a thickness on the order of 1.4 mm.

In one designed embodiment, the back curve and front curve thicknesses were chosen to be in the specified ranges, specifically 0.6 mm and 0.8 mm, respectively, to ensure adequate polymer flow without freezing the advancing melt flow, maintain the proper strength and rigidity during demolding, minimize weld line formations, and optimize cycle time reduction.

The inner concave surface of the front mold half defines the outer surface of the contact lens, while the outer convex surface of the back mold half defines the inner surface of the contact lens which rests upon the eye. Accordingly, the shape of the inner concave surface of the female mold half and the shape of the outer convex surface of the male mold half must have acceptable optical quality surfaces. The outer convex surface of the front mold half and the inner concave surface of the back mold half need not have optical quality surfaces, and in fact the side of each mold half having one of those surfaces is used by robotic handling equipment to handle the mold halves. The present invention takes advantage of this latter feature to provide molding and very rapid cooling of the critical optical quality surfaces of the contact lens molds, i.e., the inner concave surface of the front mold half and the outer convex surface of the back mold half.

Pursuant to the present invention, the master molds to mold the thermoplastic mold halves or curves are designed to achieve excellent heat transfer characteristics to quickly reduce the temperature of the molds from approximately 200–300° C. at the injection tip (by the arrow designated GATE) at which the molten thermoplastic enters the mold to approximately 80–90° C., when the mold halves can be opened in approximately three to six seconds, as compared with a typical 24 second mold cycle for the prior art.

FIG. 5 illustrates a mold assembly in which a back mold half 30 is positioned on top of a front mold half 10, and illustrates the mold cavity 42 formed therebetween, as well as the defined gap between the opposed flanges of the back and front mold halves.

Pursuant to the present invention, and referring to FIG. 14, which illustrates the molding assembly used with the bushing and power insert assembly, molten thermoplastic material is initially extruded by a screw extruder 50. When polystyrene is used as the molten thermoplastic material, the discharge end of the screw extruder 50 has a temperature of approximately 200–300° C. The molten thermoplastic material is then introduced into a heated manifold 52 having heaters 54 therein to raise the temperature of the molten thermoplastic material further, in the case of polystyrene to approximately 270–280° C. The molten thermoplastic material then flows into a hot runner system 56 which feeds two multi-tip extruders 58 (only one of which is shown in FIG. 14), each of which has four hot tip extrusion apertures 60, two of which are illustrated in FIG. 14; at this point molten polystyrene is approximately 200–300° C. One or more temperature sensors, such as thermocouples, may be strategically positioned in the molding arrangement to monitor the temperature of the molten thermoplastic, to control heaters or other parameters for control of the molding operation. Each hot tip extrusion aperture feeds a single mold cavity 62, one of which is illustrated in FIG. 14. One preferred molding arrangement includes eight mold cavities of the type which are positioned at the end of, and spaced around, the multi-tip extruders 58.

The embodiment shown in FIG. 14 is designed to manufacture front curve molds. One of the features of the present invention is that the optical quality surface of the mold half is positioned away from the heat source of the extrusion equipment, while the second non-optical quality surface of the mold half is positioned towards the heat source of the extrusive equipment. The concave surface 12 of the front mold half defines the optical quality surface, and accordingly the concave surface 12 of the front mold half is positioned on the left side in the molding arrangement of FIG. 14.

The molding cavity 62 illustrated in FIG. 14 includes a two piece optical surface molding insert 64 on the left side, and a concave single piece non-optical insert on the right side. The two piece convex optical surface insert includes an outer bushing 66a which is sealed relative to the molding machine by O-rings 68. A power insert 70 is positioned in the outer bushing 66a and is sealed relative thereto by an O-ring 72. The power insert 70 is so named because its convex surface 74 defines the optical power of the optical quality surface of the front mold half and also of the hydrogel soft contact lens which is subsequently molded in the polystyrene mold half. The two piece insert design allows the optical quality surface 74 of the power insert 70 to be machined on just the power insert, which simplifies the engineering and construction of the two piece insert 64. Moreover, different optical power (diopter) lenses can be produced by merely changing the power insert to substitute a different power insert having a different curvature convex end surface.

Figure 12A:
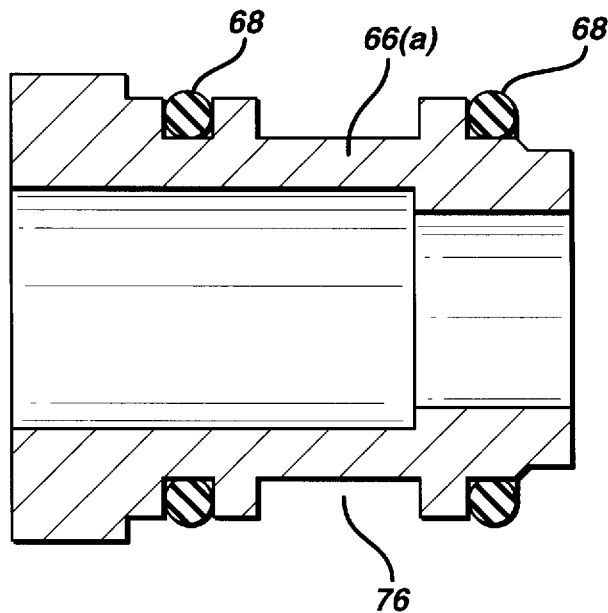
FIGS. 12(a) and 12(b) are sectional views of bushings employed with the power inserts on the optical quality side of the mold cavity illustrated in FIG. 14.

Referring now also to FIG. 12a, the first bushing 66a is shown in a side cross section view. The outer surface of the bushing 66a defines an outer circumferential cooling passageway 76 therearound, through which a coolant is continuously circulated. The circumferential cooling passageway could also be defined in the mold block which retains the bushing 66a, rather than in the bushing 66a, to reduce manufacturing costs.

A bubbler 78 is positioned within the power insert, through which coolant is continuously circulated and ejected against the inner internal surfaces of the power insert, and then flows outwardly in a reverse direction through the annular passageway around the bubbler insert.

The right side of the mold cavity of FIG. 14 defines the non-optical quality surface of the front mold half, and accordingly, in view of its simpler and less critical construction, is designed as a single piece insert bushing 80 which is sealed relative to the molding arrangement by O-rings 82. The bushing 80 includes an outer circumferential cooling passageway 84 through which a coolant is continuously circulated, and also mounts therein a bubbler insert 86, through which coolant is continuously circulated and ejected against the internal end surfaces of the insert 80, and then flows outwardly in a reverse direction through the annular passageway around the bubbler insert.

The coolant can be a solution of water and anticorrosion inhibitors, such as a 50/50 mixture of water and ethylene glycol. The coolant is continuously circulated in a turbulent flow mode by a cooling system having high power pumps to provide maximum cooling. Turbulent flow mode cooling is preferred to laminar flow cooling as it is approximately three times more effective than laminar flow cooling. Two separate coolant flow circuits are provided. The first coolant circuit has a high power pump with an 80 psi pressure head which circulates coolant at approximately 45–85° C. at a flow rate from the pump of approximately 30+5 gallons per minute to cause the coolant to circulate continuously in a turbulent flow mode through the circumferential cooling passages of each mold cavity. The eight separate mold cavities as described hereinabove are typically connected in series in the first coolant circuit, with coolant flowing in series from one mold cavity to an adjacent mold cavity, etc.

The second coolant circuit also has a high power pump with an 80 psi pressure head which circulates coolant at approximately 45–85° C. at a flow rate from the pump of approximately 30+5 gallons per minute to cause the coolant to circulate continuously in a turbulent flow mode through the bubbler inserts in each mold cavity. A differential temperature range can be set to improve part quality.

The continuous flow of coolant through the outer circumferential cooling passages 76, 84 and the inner bubblers 78, 86 results in rapid cooling of the molded curves or mold halves to approximately 80–90° C., at which temperature residual stresses are substantially locked into the molded component, particularly at the optical quality surface side, and the master mold halves can be opened along parting line (PL) to remove the molded curves or mold halves without damaging the optical quality surface of the mold halves. After opening of the master mold, a plurality of ejector pins 90, four positioned circumferentially around the mold cavity and a fifth 90' positioned at the mold tab, are displaced to the right as illustrated in FIG. 14, to eject the mold half from each cavity.

The systematic arrangement of the five ejector pins serves a useful purpose. The ejector pins are positioned to ensure minimal stress buildup in the part during part ejection; this is very important to ensure part dimensional consistency. One ejector pin is located at the distal end of the part (opposite side of the hot runner gate) to ensure adequate mold gas venting during the final filling phase, and the reduction of weld lines. The arrangement ensures smooth and reliable ejection after the part has reasonably cooled down and to minimize stress formation. This again ensures dimensional consistency. This concept lends well to cycle efficiency and deters parts from sticking to the wrong side of the mold.

THE PLATED INSERTS

As discussed earlier, the prior art teaches the use of simple geometry polished stainless steel inserts that can be formed with a multi axis grinder, but the requirement for close matching large numbers of sets of these power inserts for complex lens mold sets, makes the use of conventional grinding technology extremely difficult, if not impossible, in the formation of multifocal or bifocal molded lenses.

When the polished stainless steel power inserts are used, they require careful matching of the insert to the bushing, with a desired axial tolerance of 5 to 10 microns. This tolerance is difficult to achieve with conventional tool and die technology, which forms the steel power inserts with multiple grind, polish and inspect steps, which may require 10 to 15 repetitions to achieve the desired sphericity and surface smoothness.

At each grind, polish and inspect step, the axial dimensions is slightly altered, and with multiple steps, final assembly requires a shim assembly to achieve the desired axial dimension. Further, each time the power is changed and a new power insert used, the matching of the specific insert and its stacking shims to a specific bushing, must be maintained. In as much as there may be 8 to 16 sets of individual bushing insert assemblies for each power of lens manufactured, the process requires matching and assembly of literally hundreds of mold inserts for each injection molding machine. Further, if one is damaged, the shim stack assembly must be carefully reconstructed, possibly creating significant downtime for the injection molding machine.

In the practice of the present invention, the combination of the defined "meta lens", the plated inserts, and the diamond point turning alleviates much of this custom matching and shim stacking and thus not only improves the yield of the injection molding line, but makes possible the matching of a plurality of distance powers with a plurality of near powers on either side of the lens that would be virtually impossible with present prior art techniques. In the present invention, the inserts my be rough cut with either diamond point turning, or with conventional grind and polish operations. Preferrably, the inserts or formed of brass or brass alloys.

The use of brass or brass alloys in the inserts in lieu of steel further enhances the conduction of heat from the mold half during molding thereof, while the use of electroless NiP plating provides necessary corrosion resistance, and in combination with the diamond point turning, provides the desired sphericity and surface smoothness. Alternate plating techniques may be used to provide a coating that may be machined, without polishing, to provide the complex optical shapes required. Conventional cut, grind and polish technology can easily obliterate the subtle optical curves present in a multi-focal or bifocal lens having a plurality of closely spaced annular power changes of limited annular size.

Alternate insert forming processes may be used to form the inserts of the present invention, such as diamond point turning of a brass alloy power insert to create a power insert of desired physical properties, and then coating the insert with a thin coating of Shirley "Gloss 434" electrolens NiP or 0.5 micron layers of Cr and CrN deposited on the insert by magnatron spattering to provide the desired corrosion resistance.

Additional surface treatments and hardness coatings may be applied after the final machining of the inserts and the layers may range in thicknesses from 0.2 to 200 $\mu$m. Optionally, the final layer may be turned to thickness of 80 microns. The inserts may also be hardened, and in one hardening process, the inserts were heat treated in an $N_2$ environment.

Figure 12B:
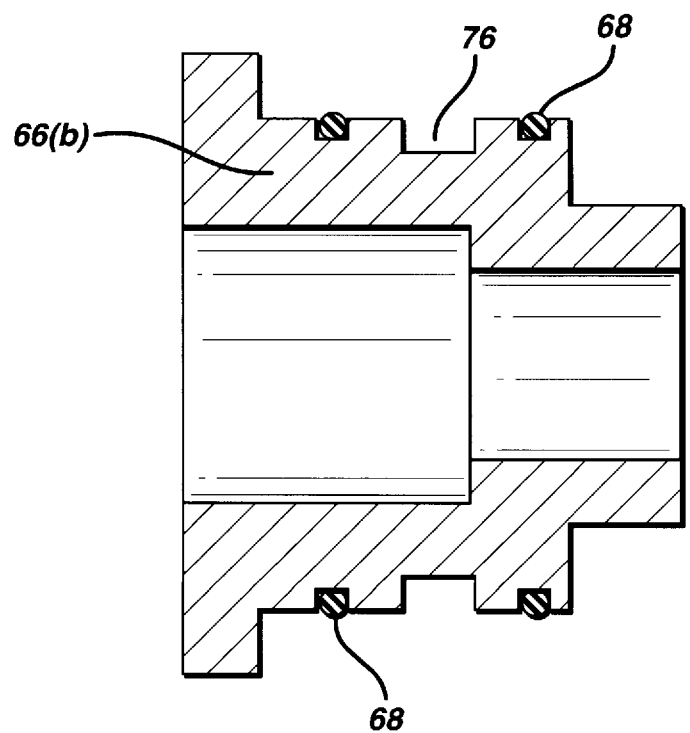
Figure 13:
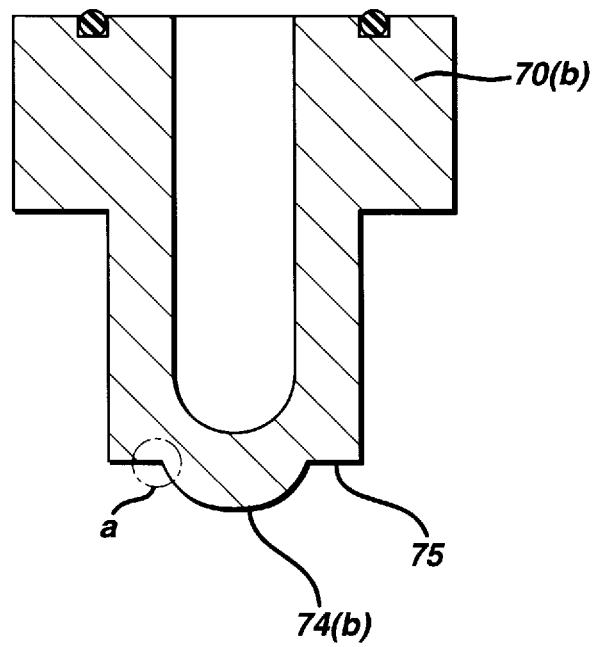
FIG. 13 is a cross sectional side view of a power insert of the present invention.

The power insert of the embodiment illustrated in FIG. 14 and 13(*c*) includes an optical surface convex end which is entirely curvate. This power insert is disposed in the cylindrical bushing element 66*a* illustrated in FIG. 12(*a*) having a flat surface at the operational end. The junction of the bushing and power insert 70*a* at the operational end forms a sharp discontinuity in the geometric profile of the end. This sharp discontinuity forms the annular edge of the lens forming central portion of the subsequently manufactured mold halves.

The second variation, shown in FIG. 13, includes a power insert 70*b* which includes an operational end comprising a convex central protuberance portion 74*b* and an annular flat surface 75 surrounding it. The interface between the convex portion 74*b* and the annular flat portion 75 comprises a sharp geometric discontinuity in the profile of the operational end of the insert, formed not by the junction of the bushing 66*b* and the insert 70*b*, but formed entirely by the specific surface profile of the end surface.

By providing this second power insert 70*b* with an annular flat surface 75 at its operational end, the critical optical surface 74*b* of the insert is protected against destructive contact with the inner surface features of the bushing 66*b* during removal and repositioning thereof, such as during cleaning, changing prescription strengths of the power inserts, and replacement.

Inasmuch as the repetitive use of the power inserts over thousands of molding cycles has an eroding effect on the power inserts, they preferably comprise a material which has considerable wear resistance to such use. In addition, inasmuch as the thermal cycling of the molding process involves significant changes in temperature, the material should have consistent and reliable thermal expansion characteristics. Further, inasmuch as a critical feature of the molding process relates to the rate at which heat may be drawn out of the plastic, the material must have a high thermal conductivity. A material which has generally been utilized for such inserts is stainless steel, however, alternative materials and combinations of materials which have desirable characteristics are described in detail hereinbelow.

The body of the power inserts 70 and 70b (shown in FIG. 13(c) and 13) may alternatively be constructed of CuZn, such CuZn30, CuNiSiCr, or Vascomax (a martensitic steel alloy having significant nickel and cobalt constituent percentages). The power inserts are premachined to approximate dimensions and are then plated with a layer electroless Nickel-Phosphor coating such as type OMI 410 with a phosphor content of 10 to 13% available from OMI International or Shirley type Niposit 90 with a phosphor content of 10 to 13%. A plurality of alternative plating materials may be utilized, for example chrome nitride or silicone oxide. The surface maybe plated to a thickness of approximately 180–200 microns.

Figure 13A:
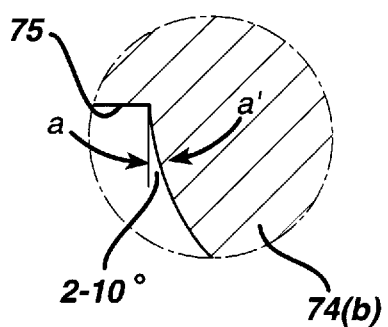
FIG. 13(a) is an enlarged view of a portion of the power insert illustrated in FIG. 13.

The plated surface of the optical insert is then turned using mono-crystalline diamond cutters, to a layer thickness of approximately 80–90 microns, therein imparting optimal optical characteristics including good sphericity (0.1–0.3 w) and low surface roughness (4–6 nm RMS) and minimal surface pitting. The use of a monocrystalline diamond cutter also provides an ultra-sharp transition or discontinuity at the interface of the convex portion 74b and the annular flat surface 75 therearound as illustrated in FIG. 13a, which is an enlarged view of portion a circled in FIG. 13. Likewise FIG. 13(b) illustrates a similar "knife edge" radius formed on the power insert illustrated in FIG. 10(b).

The ultrasharp transition provides a "knife edge" radius of 10 micrometers to 40 micrometers that is formed on the front curve mold half. This edge provides for uniform seating of the front curve mold half when the two halves are assembled, and provides a parting edge to sever excess monomer from the monomer in the mold cavity as the two halves are assembled.

Figure 13B:
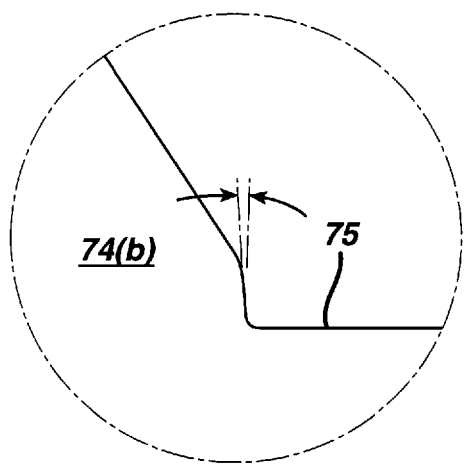
FIG. 13(b) is an enlarged view of a portion of the power insert illustrated in FIG. 10(b).

As illustrated in FIG. 13(a) and 13(b) the ultra sharp transition, diagrammatically illustrated as the angle between arrows a–a' may be from 20 to 10°, or 5 degrees in the case of the "knife edge" illustrated in FIG. 13(b) for a desired length of 20 to 200 micrometers as necessary to create the knife edge 14 illustrated in FIG. 2.

This slight taper allows the plastic mold part to be ejected off protuberance 74b without causing damage or deformation of the knife edge, and ensures tight plastic tolerance and high reproducibility for lenses molded therefrom, since the individual mold parts seal to one another in a more consistent manner.

This sharpness of the "knife edge" thus produced enhances the production of the lenses inasmuch as the plastic mold parts will not include stray plastic formed at the edge of the lens defining curvature as a result of plastic being received in the junction between the bushing and the power insert. In the present invention, if molten plastic should seep into free space between the power insert and the bushing in this variation, such stray plastic features would be in the flange portion and sufficiently remote from the optically relevant portion of the mold as to be insignificant in the production of the lenses.

While several embodiments and variations of the present invention for a molding arrangement with a mold insert design to achieve short mold cycle time are described in detail herein, it should be apparent that the disclosure and teachings of the present invention will suggest many alternative designs to those skilled in the art.

We claim:

1. A method of manufacturing complex optical surfaces in soft contact lenses, said method including:
    (a) automatically generating a cnc machine code data set for machining a contact lens mold insert to define a complex optical surface thereon;
    (b) machining a plurality of said contact lens mold inserts with said cnc data set with a single diamond point lathe, said lathe having sub-micron precision and repeatability;
    (c) simultaneously molding a first plurality of contact lens mold halves with said contact lens mold inserts to define said complex optical surface on said plurality of first mold halves;
    (d) molding a second plurality of contact mold halves to cooperate with said first plurality of mold halves wherein a single first mold half and a single second mold half cooperate to define a mold space for a soft contact lens therebetween;
    (e) assembling said first plurality of mold halves with said second plurality of mold halves with a polymerizable monomer therebetween; and
    (f) polymerizing said monomer to form a plurality of soft contact lenses having a complex optical surface.

2. The method of claim 1 which further includes a first step of automatically defining said complex optical surface with a computer assisted design program by using selected patient determined parameters and selected process determined parameters.

3. The method of claim 2 where the patient parameters further include a distance correction and a near add correction, with the near add correction machined on a first contact lens mold insert which forms the mold half used to mold the first plurality of contact lens mold halves, and the distance correction machined on a second contact lens mold insert which is used to form the second plurality of mold halves.

4. The method of claim 3 wherein the near add correction is machined into said first contact lens mold insert as a plurality of annular near add powers.

5. The method of claim 1 wherein said contact lens mold inserts are plated brass, and said complex optical surfaces are machined without polishing.

6. The method of claim 3 wherein the first plurality of contact lens mold halves forms the back surface of the soft contact lens, and the second plurality of contact lens mold haves forms the front surface of the soft contact lens.

7. The method of claim 1 wherein said contact lens mold inserts are first rough cut to an approximately optical surface, and then plated before the machining step.

8. The method of claim 2 wherein the computer assisted design program calculates said cnc machine code data set and a lens parameter data set from a single set of input data.

9. The method of claim 8 wherein said patient parameters include an astigmatic correction and said cnc machine code data set includes code for toric correction in said complex optical surface.

10. A method of molding soft contact lenses, said lenses formed between first and second intermediate mold halves that are formed by injection molding, said method comprising:
    automatically defining a complex optical surface with a computer assisted design program by using selected patient determined parameters and selected process determined parameters, plating a first optical power insert to be used in an injection mold, with a NiP coating, cutting said plated first optical power insert with a computer controlled mono-crystalline diamond cutter to create an optical power insert having complex optical characteristics, forming a plurality of said first intermediate mold halves in an injection mold with said first optical power insert, forming a plurality of said second intermediate mold halves in an injection mold, molding a contact lens between said first and second intermediate mold halves with a polymerizable composition, said contact lens having a complex optical surface with least two optical corrections formed therein.

11. A method of molding soft contact lenses as claimed in claim 10 which further includes the step of creating a first data file with said computer assisted design program, said first data file having a plurality of three dimensional coordinates for a contact lens.

12. A method of molding soft contact lenses as claimed in claim 11 which further includes translating said first data file to a computer assisted manufacturing program for operating said computer controlled mono-crystalline diamond cutter to lathe said first optical power insert.

13. The method of claim 10 where the patient parameters further include a distance correction and a near add correction, and said method includes, in addition, cutting a second optical power insert, with the near add correction cut on said first optical power insert which is used to mold said plurality of first intermediate mold halves, and the distance correction cut on a second optical power insert which is used to mold said plurality of second intermediate mold halves.

14. The method of claim 13 wherein the near add correction is cut into said first optical power insert as a plurality of annular near add zones.

15. The method of claim 13 wherein the near add correction is cut into said first optical power insert as a plurality of concentric annular near add zones to form a lens having a central optic zone, with a center distance correction and a plurality of alternating near and distance powers arranged in a concentric annular arrangement.

16. The method of claim 15 wherein said first optical power insert and said first intermediate mold half define the back surface of the lens.

17. The method of claim 10 where the patient parameters further include an astigmatic correction, and said method includes, in addition, cutting a second optical power insert, with a first cylindrical orientation cut on said first optical power insert which forms the plurality of first intermediate mold halves, and a second cylindrical correction cut on said second optical power insert which is used to form the plurality of second intermediate mold halves.

18. The method of claim 17 where the patient parameters further include a distance correction and a near add correction, and said method includes, in addition, cutting a near add correction on said first optical power insert which is used to mold said plurality of first intermediate mold halves.

19. A method of molding soft contact lenses as claimed in claim 11 which further includes translating said first data file for a first or a second computer assisted manufacturing program for operating a first or a second computer controlled lathe, depending on the patient parameters entered.

20. A method of molding soft contact lenses as claimed in claim 11 which further includes translating said first data file into a lens specification chart, an insert specification chart or CNC code to drive a computer controlled astigmatic lathe having a mono-crystalline diamond cutter which lathes said first optical power insert.

21. A method of manufacturing complex optical surfaces for soft multi-focal contact lenses, said method including:

(a) automatically defining a complex optical surface with a computer assisted design program by using selected patient determined parameters and selected process determined parameters, said complex optical surface defined in a data set, said data set having a plurality of three dimensional coordinates that define a multi-focal contact lens;

(b) automatically machining a first optical power insert with a computer controlled mono-crystalline diamond cutter to create an optical power insert, said insert having a complex optical surface defined by said data set, (c) forming a plurality of first intermediate mold halves in an injection mold with said first optical power insert, (d) forming a plurality of second intermediate mold halves in an injection mold, said first and said second halves together defining a distance correction and a near add correction for a multi-focal contact lens to be molded therebetween;

(e) molding a plurality of multi-focal contact lens between said first and second intermediate mold halves with a polymerizable composition, each of said multi-focal contact lenses having at least two optical corrections formed thereon.

22. The method of claim 21 where the patient parameters further include a distance correction and a near add correction, and said method includes, in addition, cutting a second optical power insert, with the near add correction cut on said first optical power insert which is used to mold said plurality of first intermediate mold halves, and the distance correction cut on a second optical power insert which is used to mold said plurality of second intermediate mold halves.

23. The method of claim 22 wherein the near add correction is cut into said first optical power insert as a plurality of annular near add zones.

24. The method of claim 22 wherein the near add correction is cut into said first optical power insert as a plurality of concentric annular near add zones to form a lens having a central optic zone, with a center distance correction and a plurality of alternating near and distance powers arranged in a concentric annular arrangement.

25. The method of claim 24 wherein said first optical power insert and said first intermediate mold half define the back surface of the lens.

26. The method of claim 21 where the patient parameters further include an astigmatic correction, and said method includes, in addition, cutting a second optical power insert, with a first cylindrical orientation cut on said first optical power insert which forms the plurality of first intermediate mold halves, and a second cylindrical correction cut on said second optical power insert which is used to form the plurality of second intermediate mold halves.

27. The method of claim 26 where the patient parameters further include a distance correction and a near add correction, and said method includes, in addition, cutting a near add correction on said first optical power insert which is used to mold said plurality of first intermediate mold halves.

* * * * *